(12) United States Patent
Tang

(10) Patent No.: US 10,798,194 B2
(45) Date of Patent: Oct. 6, 2020

(54) WEBPAGE PUSHING METHOD, CLIENT, SERVER, AND SYSTEM

(71) Applicant: TENCENT TECHNOLOGY (SHENZHEN) COMPANY LIMITED, Shenzhen, Guangdong (CN)

(72) Inventor: Wen Tang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 167 days.

(21) Appl. No.: 15/203,720

(22) Filed: Jul. 6, 2016

(65) Prior Publication Data

US 2016/0316035 A1  Oct. 27, 2016

Related U.S. Application Data

(63) Continuation of application No. PCT/CN2015/070746, filed on Jan. 15, 2015.

(30) Foreign Application Priority Data

Jan. 16, 2014 (CN) .......................... 2014 1 0021149

(51) Int. Cl.
*H04L 29/08* (2006.01)
*G06F 16/957* (2019.01)
*H04L 29/06* (2006.01)

(52) U.S. Cl.
CPC .......... *H04L 67/26* (2013.01); *G06F 16/9574* (2019.01); *H04L 67/02* (2013.01); *H04L 67/42* (2013.01)

(58) Field of Classification Search
CPC ......... H04L 67/26; H04L 67/02; H04L 67/42; G06F 17/30902

(Continued)

(56) References Cited

U.S. PATENT DOCUMENTS

2003/0220989 A1*  11/2003  Tsuji ................. G06F 17/30902
                                                  709/220
2004/0103199 A1*  5/2004  Chao ................. G06F 17/30902
                                                  709/228

(Continued)

FOREIGN PATENT DOCUMENTS

CN      101030227 A     9/2007
CN      101201827 A     6/2008

(Continued)

OTHER PUBLICATIONS

International Search Report for International Application No. PCT/CN2015/070746, dated Apr. 20, 2015.

(Continued)

*Primary Examiner* — Umar Cheema
*Assistant Examiner* — Tony Williams
(74) *Attorney, Agent, or Firm* — Brinks Gilson & Lione

(57) ABSTRACT

A webpage pushing method includes sending, by a client, a page loading request to a server, where the page loading request carries an identifier of the client and cache change information of the client. The method includes the server, a home page according to the page loading request, and parsing the home page to acquire a key sub-resource for loading the home page. The method includes returning, by the server, the home page to the client, acquiring, through calculation according to the cache change information of the client, a key sub-resource that does not exist in the client from the key sub-resource for loading the home page, and pushing the key sub-resource that does not exist in the client to the client.

13 Claims, 14 Drawing Sheets

(58) Field of Classification Search
USPC .......................................................... 709/203
See application file for complete search history.

(56) References Cited

U.S. PATENT DOCUMENTS

| | | | |
|---|---|---|---|
| 2008/0201331 A1* | 8/2008 | Eriksen | G06F 17/30902 |
| 2010/0088612 A1 | 4/2010 | Jia et al. | |
| 2011/0179138 A1* | 7/2011 | Van Geest | G06F 17/30902 |
| | | | 709/217 |
| 2012/0084346 A1 | 4/2012 | Mickens | |
| 2012/0210243 A1* | 8/2012 | Uhma | G06F 17/30893 |
| | | | 715/744 |
| 2013/0339472 A1* | 12/2013 | Ruellan | H04L 67/2842 |
| | | | 709/214 |
| 2014/0188976 A1* | 7/2014 | Plamondon | G06F 12/0862 |
| | | | 709/202 |
| 2014/0201617 A1 | 7/2014 | Liang | |

FOREIGN PATENT DOCUMENTS

| | | |
|---|---|---|
| CN | 101431525 A | 5/2009 |
| CN | 102185923 A | 9/2011 |
| CN | 102456035 A | 5/2012 |
| CN | 103440276 A | 12/2013 |

OTHER PUBLICATIONS

International Preliminary Report for Application No. PCT/CN2015/070746, dated Jul. 19, 2016.
Chinese Office Action for Application No. 2014100211498 dated Sep. 30, 2017, and an English concise explanation of relevance thereof.

* cited by examiner

WEBPAGE PUSHING METHOD, CLIENT, SERVER, AND SYSTEM

CROSS-REFERENCE TO RELATED APPLICATIONS

This application is a continuation of International Application No. PCT/CN2015/070746, filed Jan. 15, 2015. This application claims the benefit and priority of Chinese Application No. 201410021149.8, filed Jan. 16, 2014. The entire disclosures of each of the above applications are incorporated herein by reference.

FIELD

The present disclosure relates to the field of Internet technologies and to webpage pushing.

BACKGROUND

This section provides background information related to the present disclosure which is not necessarily prior art.

When loading a webpage, a client may send a request to a server to pull page data. Before receiving a request from a client, a server pushes some resources to the client in advance.

The current SPDY protocol supports a Push function. That is, the server can return multiple resources for one request of the client. Through this approach, the server may push, to the client in advance, a key sub-resource necessary for displaying a page, so that a page loading speed increases.

However, in the existing method, although the server can push the key sub-resources in advance to improve the page loading speed, the server cannot determine in advance whether the client already has cache of the key sub-resources. If the client already has the cache of the key sub-resources, pushing by the server can not only increase overheads of network traffic of the client, but it can also occupy a bandwidth, which causes the decrease of the speed of acquiring other resources by the client, and lowers the speed of the page loading for the client.

SUMMARY

This section provides a general summary of the disclosure, and is not a comprehensive disclosure of its full scope or all of its features.

Various embodiments provide a webpage pushing method, including: receiving, by a server from a client, a page loading request, where the page loading request carries an identifier of the client and cache change information of the client;

acquiring, by the server, a home page according to the page loading request, and parsing the home page to acquire a key sub-resource to load the home page; and returning, by the server, the home page to the client, acquiring, through calculation according to the cache change information of the client, a key sub-resource that does not already exist in the client from the key sub-resource for loading the home page, and pushing the key sub-resource that does not exist in the client to the client.

Various embodiments further provide a webpage pushing method, including:

sending, by a client, a page loading request to a server, where the page loading request carries an identifier of the client and cache change information of the client;

receiving a home page returned by the server and a key sub-resource that does not exist in the client, pushed by the server, in a key sub-resource for loading the home page, where the key sub-resource that does not exist in the client is acquired through calculation by the server according to the cache change information of the client; and displaying the home page, and loading the key sub-resource for the home page in the home page, where the key sub-resource for the home page includes a key sub-resource that exists in the client, and the key sub-resource that does not exist in the client is pushed by the server.

Various embodiments further provide a webpage pushing system, including a client and a server, where the client is configured to send a page loading request to the server, where the page loading request carries an identifier of the client and cache change information of the client; and the server is configured to acquire a home page according to the page loading request, parse the home page to acquire a key sub-resource for loading the home page, return the home page to the client, acquire, through calculation according to the cache change information of the client, a key sub-resource that does not exist in the client from the key sub-resource for loading the home page, and push the key sub-resource that does not exist in the client to the client.

Various embodiments further provide a webpage pushing server, including:

a request receiving module, configured to receive a page loading request sent by a client, where the page loading request carries an identifier of the client and cache change information of the client;

a parsing module, configured to acquire a home page according to the page loading request, and parse the home page to acquire a key sub-resource for loading the home page; and a pushing module, configured to return the home page to the client, acquire, through calculation according to the cache change information of the client, a key sub-resource that does not exist in the client from the key sub-resource for loading the home page, and push the key sub-resource that does not exist in the client to the client.

Various embodiments further provide a webpage pushing client, including:

a sending module, configured to send a page loading request to a server, where the page loading request carries an identifier of the client and cache change information of the client;

a receiving module, configured to receive a home page returned by the server and a key sub-resource that does not exist in the client, pushed by the server, in a key sub-resource for loading the home page, where the key sub-resource that does not exist in the client is acquired through calculation by the server according to the cache change information of the client; and a loading and display module, configured to display the home page, and load the key sub-resource for the home page in the home page, where the key sub-resource for the home page includes a key sub-resource that exists in the client, and the key sub-resource that does not exist in the client previously is pushed by the server.

When a request is made to load a page in the webpage pushing method, client, server, and system provided in the various embodiments of the present disclosure, a client sends local cache change information to a server, so that the server acquires an existing cache record of the client. When sending a home page to the client, the server obtains, according to the cache change information of the client, a key sub-resource that does not exist in the client from a key sub-resource for loading the home page, and pushes the key sub-resource that does not exist in the client to the client, thereby avoiding repeated pushing of resources. This pushing mechanism not only accelerates the page loading speed for the client, but also avoids unnecessary traffic overheads.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 11A:
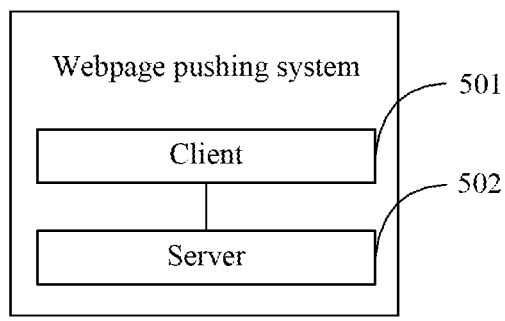
Figure 11B:
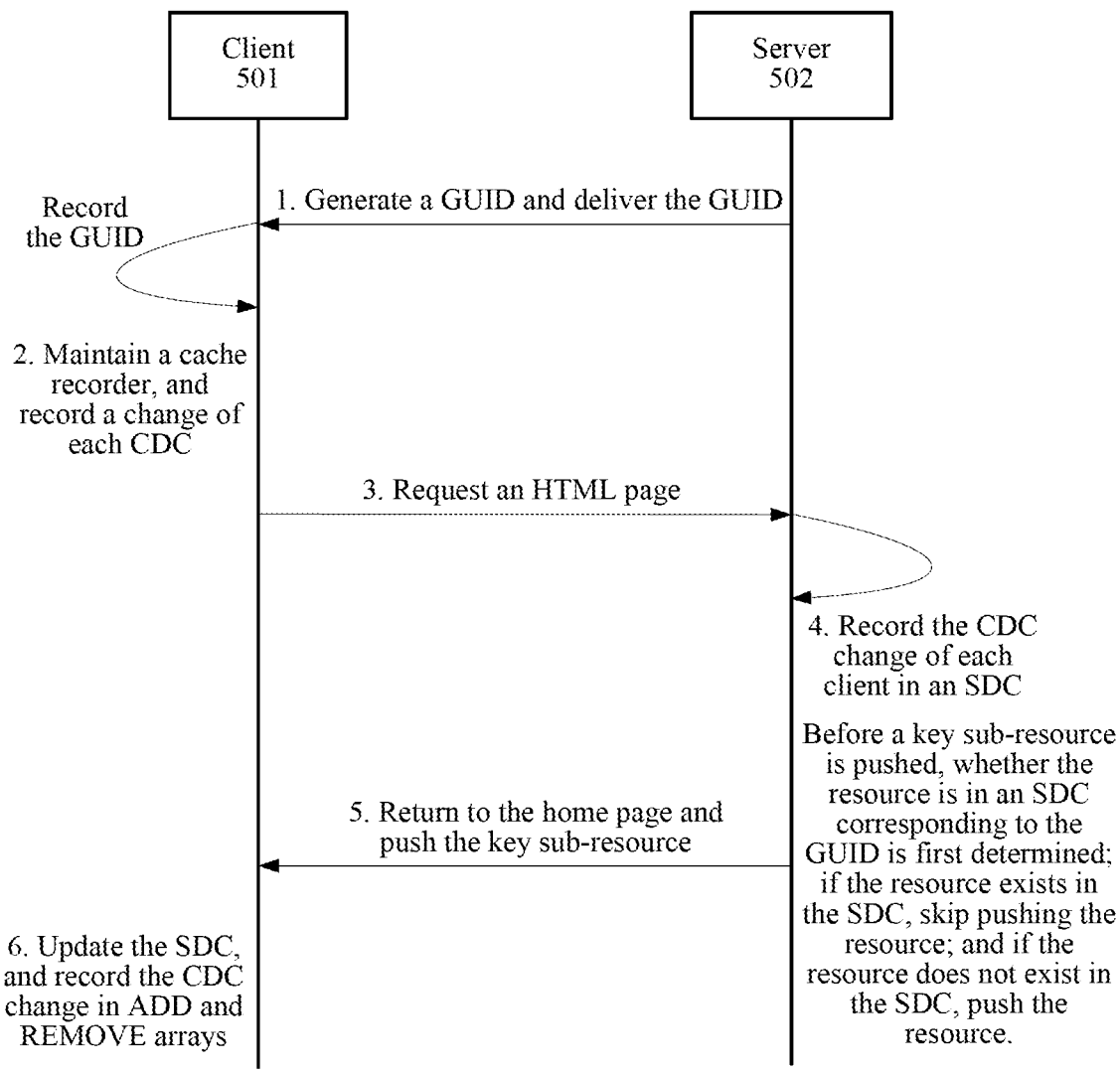
Figure 12:
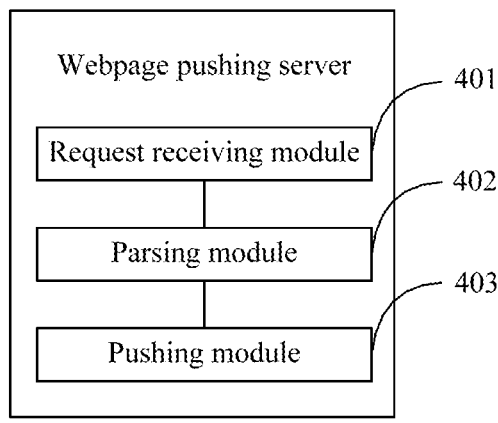
Figure 13:
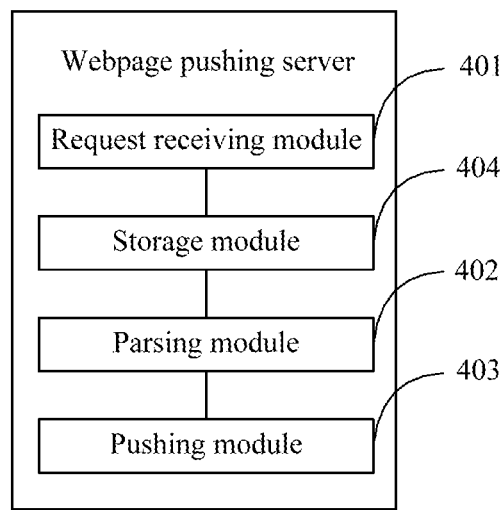
Figure 14:
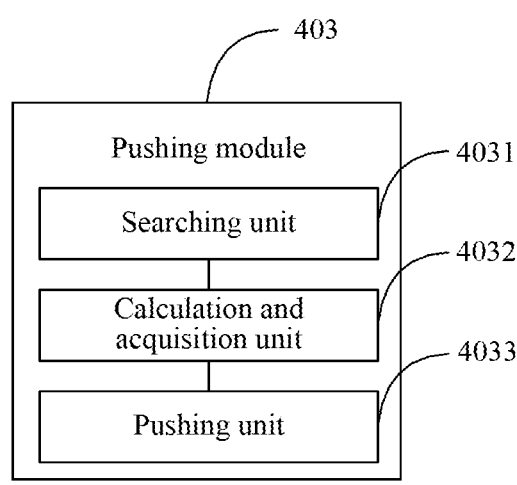
Figure 15:
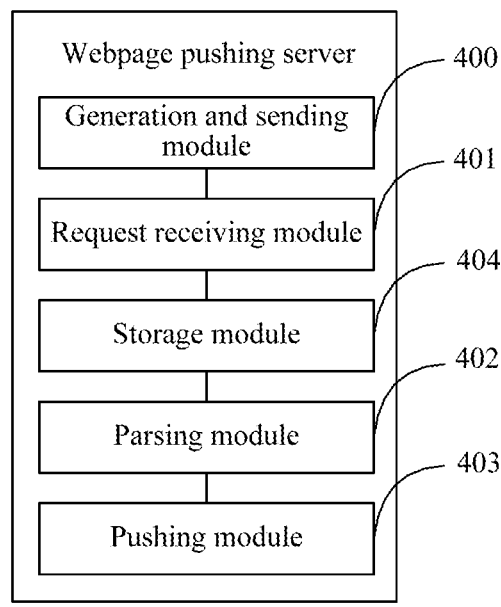
Figure 16:
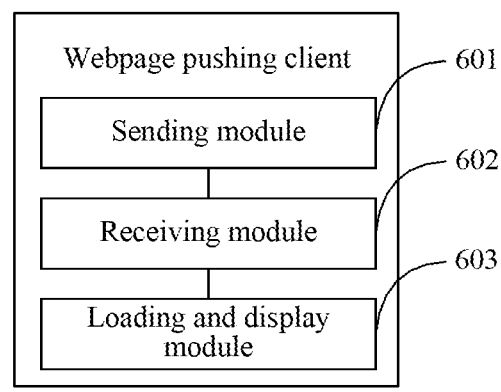
Figure 17:
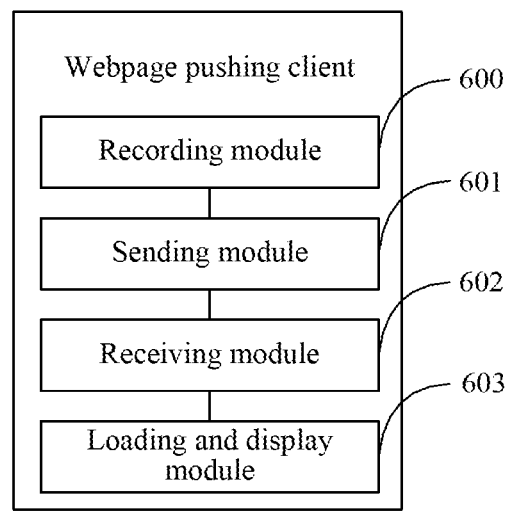
Figure 18:
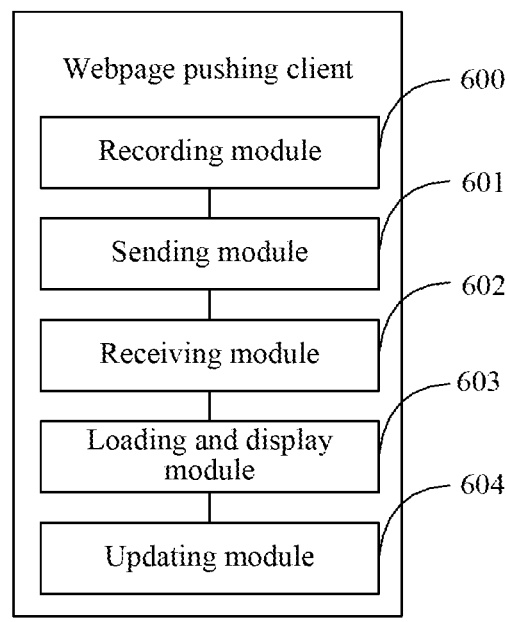

FIG. 11*a* is a structural diagram of various embodiments of a webpage pushing system according to the present disclosure;

FIG. 11*b* is a diagram of an interaction process between a client and a server in a webpage pushing system according to various embodiments of the present disclosure;

FIG. 12 is a diagram of functional modules in various embodiments of a webpage pushing server according to the present disclosure;

FIG. 13 is a diagram of functional modules in various embodiments of a webpage pushing server according to the present disclosure;

FIG. 14 is a structural diagram of a pushing module in various embodiments of a webpage pushing server according to the present disclosure;

FIG. 15 is a diagram of functional modules in various embodiments of a webpage pushing server according to the present disclosure;

FIG. 16 is a diagram of functional modules in various embodiments of a webpage pushing client according to the present disclosure;

FIG. 17 is a diagram of functional modules in various embodiments of a webpage pushing client according to the present disclosure;

FIG. 18 is a diagram of functional modules in various embodiments of a webpage pushing client according to the present disclosure.

Figure 19:
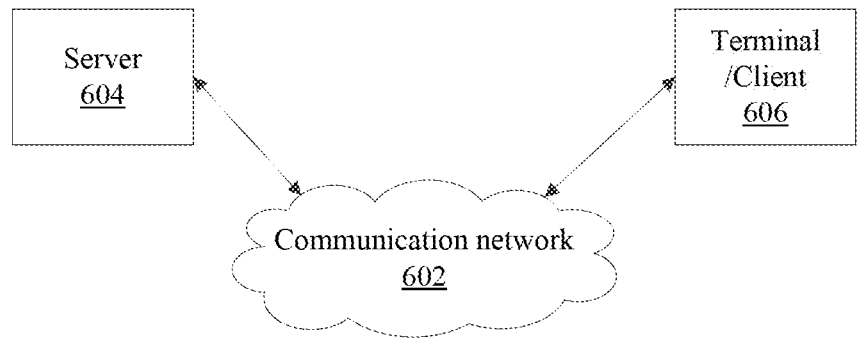
Figure 20:
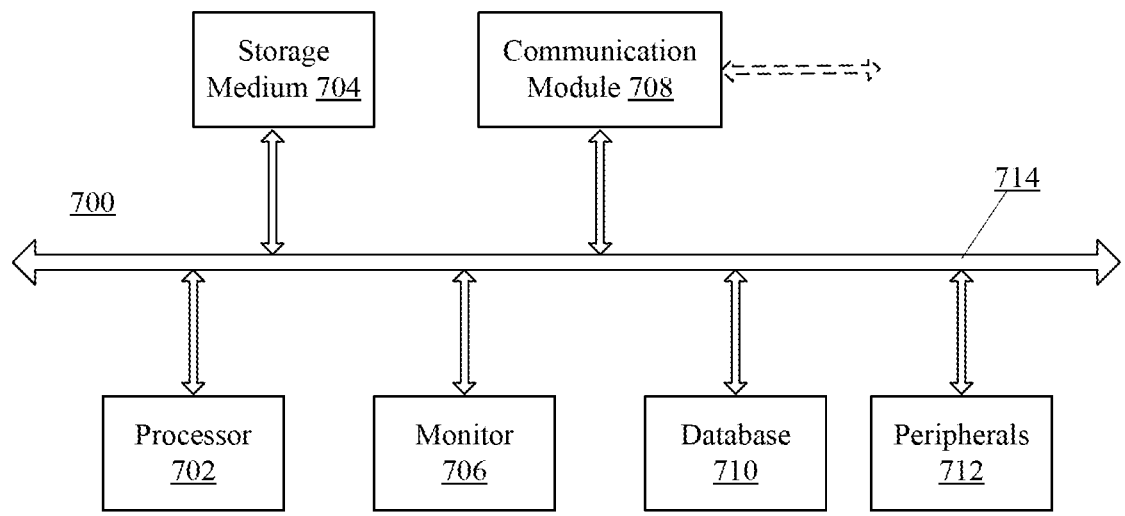

FIG. 19 depicts an exemplary environment incorporating various embodiments; and FIG. 20 depicts an exemplary computing system consistent with the various embodiments.

Corresponding reference numerals indicate corresponding parts throughout the several views of the drawings.

DETAILED DESCRIPTION

Example embodiments will now be described more fully with reference to the accompanying drawings.

It should be understood that the various embodiments described herein are merely used to explain the present disclosure, but are not used to limit the present disclosure.

FIG. 19 depicts an exemplary environment 600 incorporating exemplary methods and systems for pushing webpage in accordance with various embodiments. As shown in FIG. 19, the environment 600 can include a server 604, clients 606 (e.g., a first client and a second client), and a communication network 602. The server 604 and the clients 606 may be coupled through the communication network 602 for information exchange. Although only one client 606 and one server 604 are shown in the environment 600, any number of clients 606 or servers 604 may be included, and other devices may also be included.

The communication network 602 may include any appropriate type of communication network for providing network connections to the server 604 and clients 606 or among multiple servers 604 or clients 606. For example, the communication network 602 may include the Internet or other types of computer networks or telecommunication networks, either wired or wireless.

A client, as used herein, may refer to any appropriate user client with certain computing capabilities, e.g., a personal computer (PC), a work station computer, a hand-held computing device (e.g., a tablet), a mobile client (e.g., a mobile phone or a smart phone), or any other client-side computing device. A server, as used herein, may refer to one or more server computers configured to provide certain server functionalities. A server may also include one or more processors to execute computer programs in parallel.

The server 604 and the clients 606 may be implemented on any appropriate computing platform. FIG. 20 shows a block diagram of an exemplary computing system 700 (or computer system 700) capable of implementing the server 604 and/or the clients 606. As shown in FIG. 20, the exemplary computer system 700 may include a processor 702, a storage medium 704, a monitor 706, a communication module 708, a database 710, peripherals 712, and one or more bus 714 to couple the devices together. Certain devices may be omitted and other devices may be included.

The processor 702 can include any appropriate processor or processors. Further, the processor 702 can include multiple cores for multi-thread or parallel processing. The storage medium 704 may include memory modules, e.g., Read-Only Memory (ROM), Random Access Memory (RAM), and flash memory modules, and mass storages, e.g., CD-ROM, U-disk, removable hard disk, etc. The storage medium 704 may store computer programs for implementing various processes, when executed by the processor 702.

The monitor 706 may include display devices for displaying contents in the computing system 700. The peripherals 712 may include I/O devices such as a keyboard and a mouse.

The communication module 708 may include network devices for establishing connections through the communication network 602. The database 710 may include one or more databases for storing certain data and for performing certain operations on the stored data. In operation, the clients 606 may cause the server 604 to perform certain actions. The server 604 may be configured to provide structures and functions for such actions and operations. In various embodiments, a client involved in the disclosed methods and systems can include the clients 606, while a server involved in the disclosed methods and systems can include the server 604. The methods and systems disclosed in accordance with various embodiments can be executed by a computer system.

Various embodiments provide methods and systems for pushing a webpage. The methods and systems are illustrated and described herein.

Figure 1:
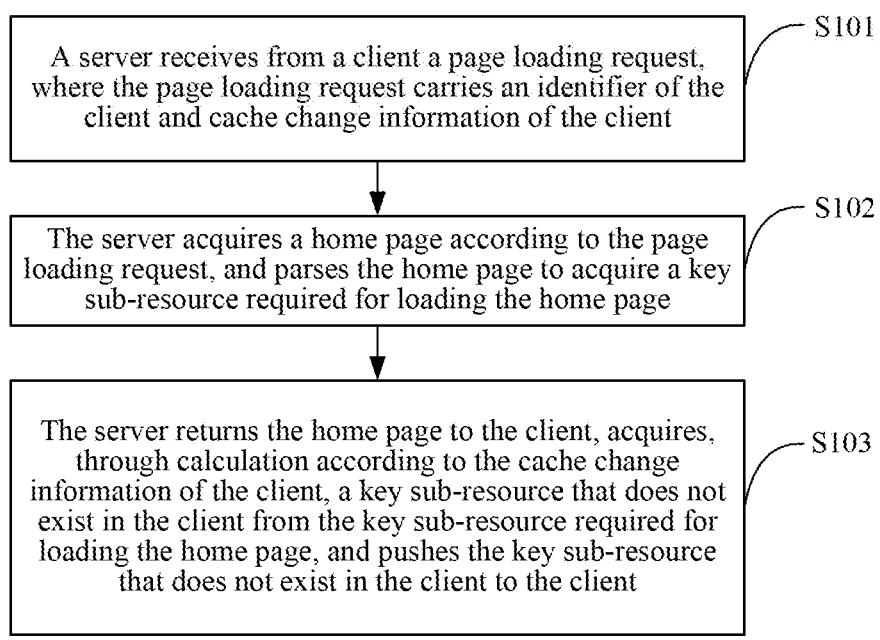
FIG. 1 is a flowchart of various embodiments of a webpage pushing method according to the present disclosure.

As shown in FIG. 1, various embodiments of the present disclosure provide a webpage pushing method, including the following.

Block 101: A server receives from a client a page loading request, where the page loading request carries an identifier of the client and cache change information of the client.

A running environment of the method in various embodiments involves the client and the server, where the client may be a PC, or a mobile client capable of displaying a webpage, such as a mobile phone or a tablet computer. The client may display different webpages according to a website or webpage clicking operation instruction input by a user, where webpage data is pulled by the client by sending a request to the server, or is actively pushed to the client by the server.

To improve a webpage loading speed, the server may return multiple resources in response to one request of the client. Through this method, the server may push, to the client in advance, a key sub-resource necessary for displaying a page, so that the page loading speed increases.

In the existing pushing method, the server cannot determine in advance whether the client already has cache of the key sub-resource; therefore, the server pushes a key sub-resource that is already cached in the client, thereby increasing network traffic overheads on the client, occupying a bandwidth, and reducing the page loading speed to the client.

In various embodiments, through the Q-Push protocol, when pushing resources to the client, the server may ensure, according to the cache change information recorded in the client, that a key sub-resource pushed by the server is the key sub-resource that does not exist in the client, so as to achieve an effect of improving a pushing speed and reducing traffic overheads to the client.

When a user first needs to display a webpage, the client sends the page loading request to the server, where the page loading request may be sent to the server in a manner of an http request. The page loading request carries information, such as a URL address, of a webpage that the client requests to display, and the page loading request further carries the identifier of the client and local cache change information recorded in the client. The identifier of the client may be a digital identifier that is pre-generated for the client by the server, and is used as a unique identifier of the client to mark the client. In one implementation manner, the digital identifier may be a digital identifier that has a binary length being 128 bits and is generated according to a predefined algorithm. The identifier of the client may also be a unique identifier, where the unique identifier is generated by the client or another third-party server under agreement between the client and the server. The client locally saves the identifier, and each time the client subsequently interacts with the server, the client adds the identifier in the request. The local cache change information recorded in the client may include information about the client adding or decreasing cache data corresponding to one URL.

The client records, by maintaining a cache recorder, change information of each cache by the client, records the added URL or a hash value corresponding to the URL in an ADD array, and records the deleted URL or a hash value corresponding to the URL in a REMOVE array. Using an http request as an example, when the client sends the http request, the client adds fields "globally unique identifier (GUID)" and "Q-Push:" in a header of the http request. The GUID (which is a digital identifier that has a binary length being 128 bits, is generated according to an algorithm, and may be used for marking the client) is identifier information delivered by the server. The Q-Push records URLs corresponding to the ADD and REMOVE arrays, or hash values corresponding to the URLs.

Block S102: The server acquires a home page according to the page loading request, and parses the home page to acquire a key sub-resource necessary for loading the home page. After receiving the page loading request sent by the client, the server acquires corresponding page data according to the URL address carried in the page loading request and uses the page data as home page data returned to the client. The server further parses the home page data to obtain the key sub-resource necessary for loading the home page to the client. The key sub-resource is a resource playing a critical role on parsing and rendering one HTML, where the resource generally is a script language (JS)/cascading style sheet (CSS) of the client or the like. The sub-resource is a resource opposite from a main resource of a home page. The main resource refers to one entire HTML page, and the sub-resource refers to files, such as pictures, frames, or scripts, externally cited on the HTML page, and is opposite to the main resource. Generally, when returning the home page data to the client, the server pushes, to the client according to the request of the client or actively, the key sub-resource necessary for loading the home page. The server in various embodiments may acquire, through calculation according to the cache change information of the client, the key sub-resource that does not exist in the client from the key sub-resource necessary for loading the home page, and push the acquired key sub-resource to the client, so as to save traffic overheads and improve the webpage loading speed to the client.

Block S103: The server returns the home page to the client, acquires, through calculation according to the cache change information of the client, the key sub-resource that does not exist in the client from the key sub-resource necessary for loading the home page, and pushes the key sub-resource that does not exist in the client to the client. In various embodiments, it is considered that in the key sub-resources necessary for loading the home page to the client, some key sub-resources may be cached on the client; therefore, the server may push the key sub-resource that does not exist in the client to the client, thereby saving traffic overheads and improving the webpage loading speed on the client.

During operation, the server first acquires a cache change situation of the client from historical records according to the identifier of the client carried in the page loading request, and obtains, through calculation according to cache change information currently sent by the client, a key sub-resource that already exists in the client from the key sub-resource necessary for loading the home page; therefore, the key sub-resource that does not exist in the client may be acquired from the key sub-resource necessary for loading the home page and according to the key sub-resource that already exists in the client.

Further, when returning the home page to the client, the server may return the key sub-resource that does not exist in the client to the client in a manner of SPDY PUSH. The SPDY is the enhanced protocol of the HTTP protocol, where the function of the protocol includes multi-path multiplexing of a data stream, a request priority, and HTTP header compression.

On the side of the client, the client may cache the key sub-resource pushed by the server. When displaying the home page, the client may load the key sub-resource necessary for displaying the home page, where the key sub-resource necessary for the home page and loaded by the client includes the key sub-resource that already exists in the client, and the key sub-resource that did not exist in the client previously is pushed by the server. Compared with the prior art, the client does not need to send the request to the server again to acquire the key sub-resource that is not cached locally, and the server may not push the key sub-resource that already exists in the client to the client repeatedly, which accelerates the speed of transmitting the key sub-resource JS/CSS, does not cause the traffic caused by the retransmission, and improves the webpage loading speed on the client.

Figure 2:
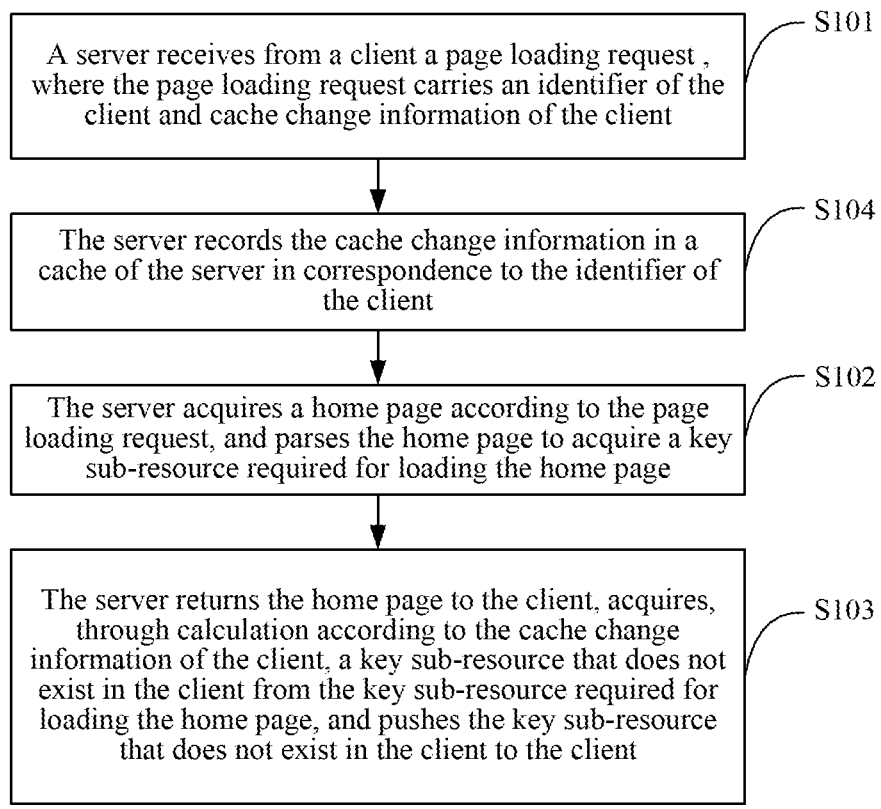
FIG. 2 is a flowchart of various embodiments of a webpage pushing method according to the present disclosure.

As shown in FIG. 2, various embodiments of the present disclosure provide a webpage pushing method, after the sending, by a client, a page loading request to a server in block S101. The method further includes the following.

Block S104: The server records the cache change information of the client in a cache of the server in correspondence to the identifier of the client.

A difference between this embodiment and the embodiment shown in FIG. 1 lies in that this embodiment further includes a method in which the server records and caches the acquired cache change information of the client.

Considering that the server receives page loading requests from different clients, to improve page pushing efficiency, in various embodiments, after receiving the page loading request sent by the client, the server extracts the cache change information of the client from the page loading request, and records the cache change information of the client in the cache of the server in correspondence with the identifier of the client. During subsequent operation, the server first searches for the cache change information of the client from the cache of the server according to the identifier of the client carried in the page loading request, and then acquires, through calculation according to the cache change information of the client, the key sub-resource that already exists from the key sub-resource necessary for loading the home page. The key sub-resource that does not exist in the client is then acquired from the key sub-resource necessary for loading the home page and according to the key sub-resource that already exists in the client, and the key sub-resource that does not already exist in the client is pushed to the client.

In various embodiments, by using the foregoing, when requesting to load a page, the client sends the local cache change information to the server, so that the server acquires a cache record that already exists in the client. When returning the home page to the client, the server obtains, according to the cache change information of the client, the key sub-resource that does not exist in the client from the key sub-resource necessary for loading the home page, and pushes the key sub-resource that does not exist in the client to the client, thereby avoiding repeated resource pushing, accelerating the page loading speed on the client, and avoiding unnecessary traffic overheads. In addition, after acquiring the cache change information of the client, the server records the cache change information of the client in the cache of the server in correspondence to the identifier of the client, so as to facilitate calculation and improve calculation efficiency and page data pushing efficiency.

Figure 3:
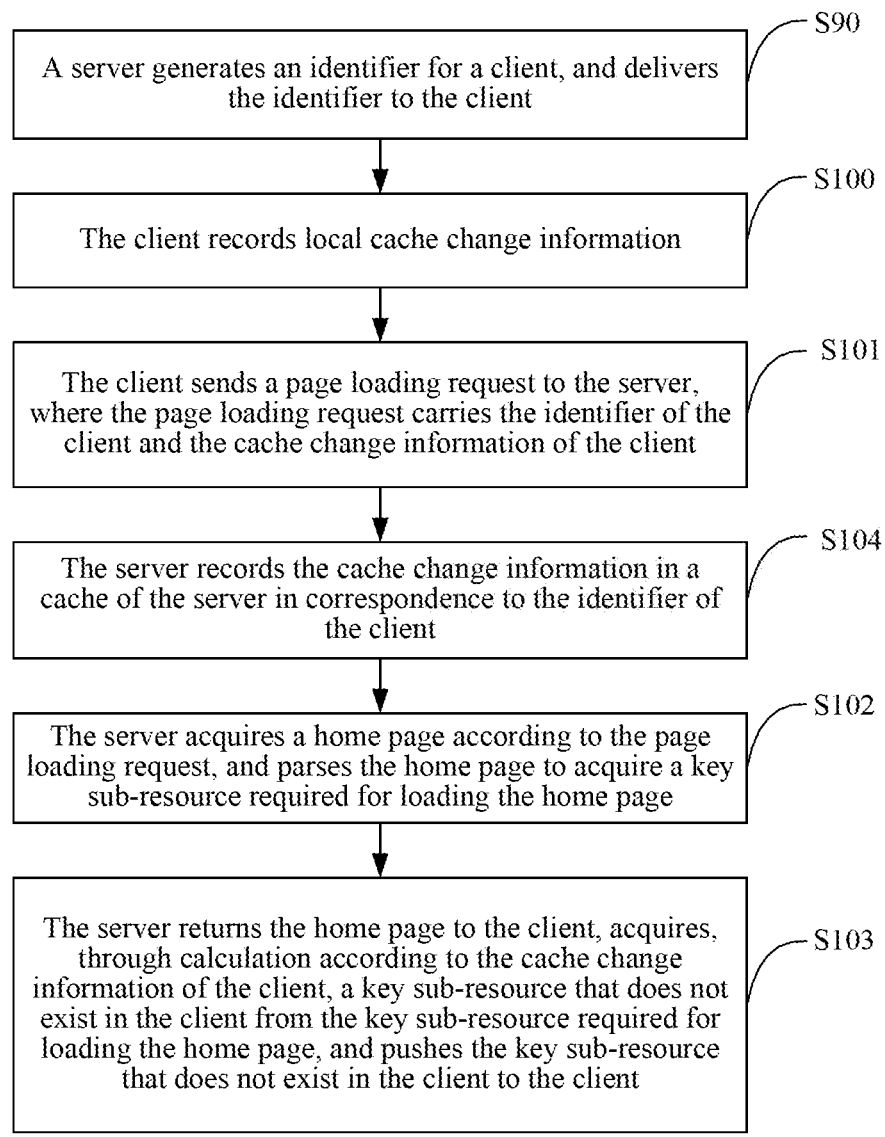
FIG. 3 is a flowchart of various embodiments of a webpage pushing method according to the present disclosure.

As shown in FIG. 3, various embodiments of the present disclosure provide a webpage pushing method, before the client sends a page loading request to a server in block S101. The method further includes the following.

Block S90: The server generates the identifier for the client, and delivers the identifier to the client.

Block S100: The client records local cache change information.

A difference between this embodiment and the embodiment shown in FIG. 2 lies in that this embodiment further includes the method in which the server generates the identifier for the client and the client records the local cache change information. The server generates a digital identifier for the client, where the digital identifier is used as a unique identifier of the client to mark the client. In one implementation manner, the digital identifier may be a digital identifier that has a binary length of 128 bits and is generated according to a predefined algorithm. After generating the identifier for the client, the server delivers the identifier to the client.

The local cache change information includes information about the client adding or decreasing cache data corresponding to one URL. The process of recording, by the client, the local cache change information includes the following.

Recording, in an add array, the URL added by the client or a hash value corresponding to the URL, and recording, in a remove array, the URL deleted by the client or a hash value corresponding to the URL.

Recording the hash value corresponding to the URL may decrease the traffic overheads. The involved hash algorithm may be defined according to needs. The following provides one reference hash algorithm:

```
uint32 SuperFastHash(const char * data, int len) {
    uint32_t hash = len, tmp;
    int rem;
    if (len <= 0 || data == NULL)
        return 0;
    rem = len & 3;
    len >>= 2;
    /* Main loop */
    for (; len > 0; len--) {
        hash += get16bits(data);
        tmp = (get16bits(data + 2) << 11) ^ hash;
        hash = (hash << 16) ^ tmp;
        data += 2 * sizeof(uint16_t);
        hash += hash >> 11;
    }
    /* Handle end cases */
    switch (rem) {
        case 3:
            hash += get16bits(data);
            hash ^= hash << 16;
            // Treat the final character as signed. This ensures all platforms
```

-continued

```
behave
    // consistently with the original x86 code.
        hash ^= static_cast<signed char>(data[sizeof(uint16_t)]) << 18;
        hash += hash >> 11;
        break;
    case 2:
        hash += get16bits(data);
        hash ^= hash << 11;
        hash += hash >> 17;
        break;
    case 1:
        hash += static_cast<signed char>(*data);
        hash ^= hash << 10;
        hash += hash >> 1;
    }
    /* Force "avalanching" of final 127 bits */
    hash ^= hash << 3;
    hash += hash >> 5;
    hash ^= hash << 4;
    hash += hash >> 17;
    hash ^= hash << 25;
    hash += hash >> 6;
    return hash;
}.
```

In various embodiments, by using the foregoing the server generates the identifier for the client and delivers the identifier to the client. The client records the local cache change information. When requesting to load a page, the client sends the local cache change information to the server, so that the server acquires a cache record that already exists in the client. When returning the home page to the client, the server obtains, according to the cache change information of the client, the key sub-resource that does not exist in the client from the key sub-resource necessary for loading the home page, and pushes the key sub-resource that does not already exist in the client to the client, thereby avoiding repeated resource pushing, accelerating the page loading speed to the client, and avoiding unnecessary traffic overheads. In addition, after acquiring the cache change information of the client, the server records the cache change information of the client in the cache of the server in correspondence to the identifier of the client, so as to facilitate calculation and improve calculation efficiency and page data pushing efficiency.

Figure 4:
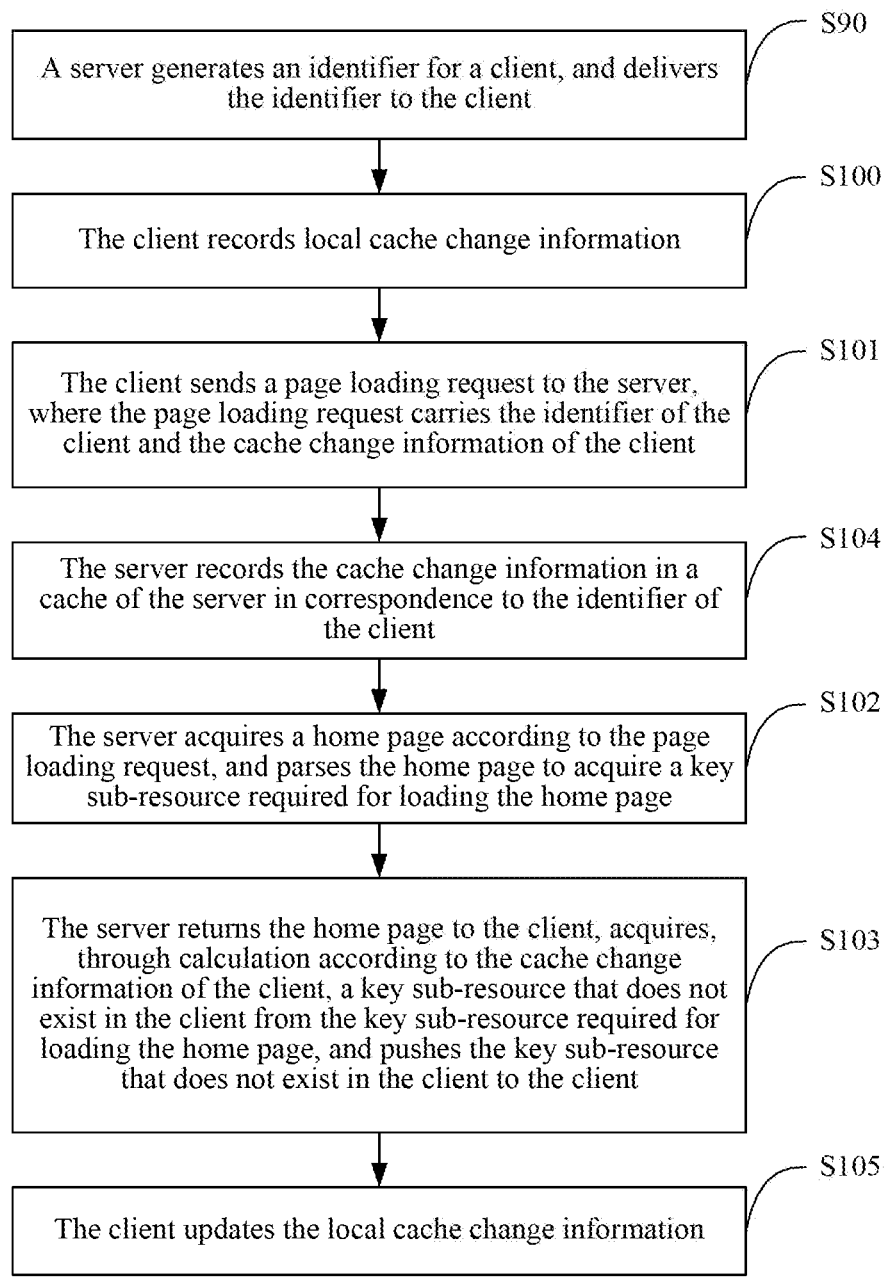
FIG. 4 is a flowchart of various embodiments of a webpage pushing method according to the present disclosure.

As shown in FIG. 4, various embodiments of the present disclosure provide a webpage pushing method, where after the server returns the home page to the client, acquiring, through calculation according to the cache change information of the client, the key sub-resource that does not exist in the client from the key sub-resource necessary for loading the home page, and pushing the key sub-resource that does not already exist in the client to the client in block S103. The method further includes the following.

Block S105: The client updates the local cache change information including the following. Removing, by the client from the add array or the remove array, a URL pushed by the server or a hash value corresponding to the URL.

A difference between this embodiment and the embodiment shown in FIG. 3 lies in that in this embodiment, the client updates the local cache change information.

After receiving the key sub-resource pushed by the server and completing page loading and displaying, the client removes, from the ADD and REMOVE arrays, a URL previously sent through the Q-Push by the server or a corresponding hash value, which can save client cache resources and also ensures accuracy of the cache change information of the client, thereby further accelerating the page loading speed to the client.

When accessing a new webpage, the client repeats the foregoing process.

In various embodiments, by using the foregoing method, the server generates the identifier for the client, and delivers the identifier to the client. The client records the local cache change information. When requesting to load a page, the client sends the local cache change information to the server, so that the server acquires a cache record that already exists in the client. When returning the home page to the client, the server obtains, according to the cache change information of the client, the key sub-resource that does not already exist in the client from the key sub-resource necessary for loading the home page, and pushes the key sub-resource that does not exist in the client to the client, thereby avoiding repeated resource pushing, accelerating the page loading speed on the client, and avoiding unnecessary traffic overheads. In addition, after acquiring the cache change information of the client, the server records the cache change information of the client in the cache of the server in correspondence to the identifier of the client, so as to facilitate calculation and improve calculation efficiency and page data pushing efficiency. After receiving the key sub-resource pushed by the server and completing page loading and displaying, the client removes, from the ADD and REMOVE arrays, a URL previously sent through the Q-Push by the server or a corresponding hash value, which can save cache resources of the client, ensures accuracy of the cache change information of the client, and further accelerates the page loading speed on the client.

Figure 5:
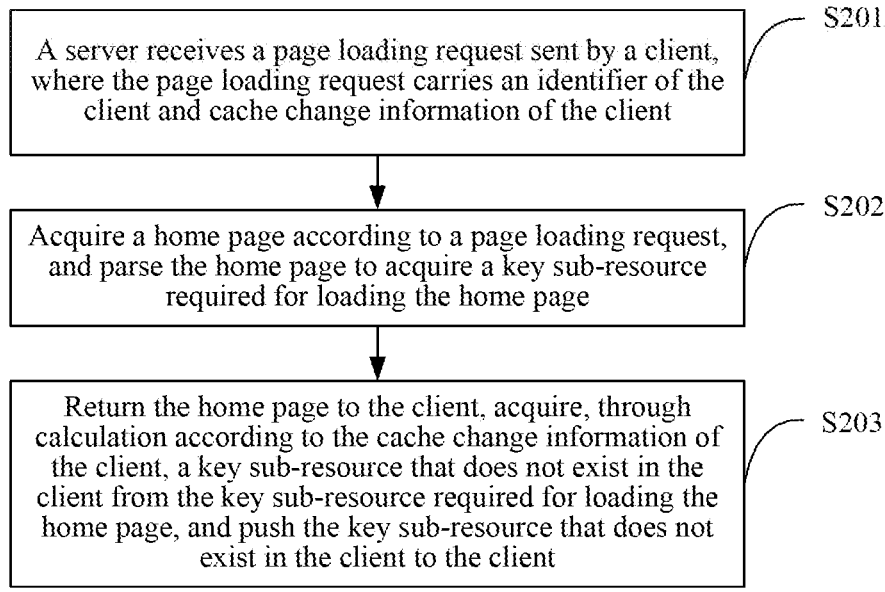
FIG. 5 is a flowchart of various embodiments of a webpage pushing method according to the present disclosure.

As shown in FIG. 5, various embodiments of the present disclosure provide a webpage pushing method, including the following.

Block S201: A server receives a page loading request sent by a client, where the page loading request carries an identifier of the client and cache change information of the client.

Block S202: Acquire a home page according to the page loading request and parse the home page to acquire a key sub-resource necessary for loading the home page.

Block S203: Return the home page to the client, acquire, through calculation according to the cache change information of the client, a key sub-resource that does not already exist in the client from the key sub-resource necessary for loading the home page, and push the key sub-resource that does not already exist in the client to the client.

A running environment of the method in various embodiments of the present disclosure involves the client and the server, where the client may be a PC, or a mobile client capable of displaying a webpage, such as a mobile phone or a tablet computer. The client may display different webpages according to a website or webpage clicking operation instruction input by a user, where webpage data is pulled by the client by sending a request to the server, or is actively pushed to the client by the server.

To improve the webpage loading speed to the client, the server may return multiple resources to one request of the client. Through this method, the server may push, to the client in advance, the key sub-resource necessary for displaying the page, so that the page loading speed increases. In the existing pushing method, the server cannot determine in advance whether the client already has cache of the key sub-resource; therefore, the server pushes a key sub-resource that is already cached in the client, thereby increasing network traffic overheads on the client, occupying a bandwidth, and reducing the page loading speed on the client.

In various embodiments, through the Q-Push protocol, when pushing resources to the client, the server may ensure, according to the cache change information recorded in the client, that a key sub-resource pushed by the server is the key sub-resource that does not already exist in the client, so as to achieve an effect of improving a pushing speed and reducing traffic occupation on the client. When a user needs to display a webpage, the client sends the page loading request to the server, where the page loading request may be sent to the server in a manner of an http request. The page loading request carries information such as a URL address of a webpage that the client requests to display, and the page loading request further carries the identifier of the client and local cache change information recorded in the client. The identifier of the client may be a digital identifier that is pre-generated for the client by the server and is used as a unique identifier of the client to mark the client. In one implementation manner, the digital identifier may be a digital identifier that has a binary length of 128 bits and is generated according to a predefined algorithm. The identifier of the client may also be a unique identifier, where the unique identifier is generated by the client or another third-party server under agreement between the client and the server. The client locally saves the identifier, and each time that the client subsequently interacts with the server, the client adds the identifier in the request.

The local cache change information recorded in the client may include when the client adds or decreases cache data corresponding to one URL. The client may maintain a cache recorder, record change information of each cache by the client, record the added URL or a hash value corresponding to the URL in an ADD array, and record the deleted URL or a hash value corresponding to the URL in a REMOVE array.

Using an http request as an example, when the client sends the http request, the client adds fields "GUID" and "Q-Push:" in a header of the http request. The GUID (which is a digital identifier that has a binary length of 128 bits, is generated according to an algorithm, and may be used for marking the client) is identifier information delivered by the server. The Q-Push records URLs corresponding to the ADD and REMOVE arrays, or hash values corresponding to the URLs.

After receiving the page loading request sent by the client, the server acquires corresponding page data according to the URL address carried in the page loading request and uses the page data as home page data returned to the client. The server further parses the home page data to obtain the key sub-resource necessary for loading the home page on the client. The key sub-resource is a resource playing a critical role in parsing and rendering one HTML, where the resource generally is a JS/CSS of the client, or the like. The sub-resource is a resource opposite from a main resource of a home page. The main resource refers to one entire HTML page, and the sub-resource refers to files, such as pictures, frames, or scripts, externally cited on the HTML page, and is opposite to the main resource. When returning the home page data to the client, the server pushes, to the client according to the request of the client or actively, the key sub-resource necessary for loading the home page. The server in various embodiments may acquire, through calculation according to the cache change information of the client, the key sub-resource that does not exist in the client from the key sub-resource necessary for loading the home page, so as to save traffic overheads and improve the webpage loading speed on the client. In various embodiments, it is considered that in the key sub-resources necessary for loading the home page on the client, some key sub-resources may be cached on the client; therefore, the server may push the key sub-resource that does not already exist in the client to the client, thereby saving traffic overheads and improving the webpage loading speed on the client.

During operation, the server first acquires a cache change situation of the client from historical records according to the identifier of the client carried in the page loading request, and obtains, through calculation according to cache change information currently sent by the client, a key sub-resource that already exists in the client from the key sub-resource necessary for loading the home page; therefore, the key sub-resource that does not exist in the client may be acquired from the key sub-resource necessary for loading the home page and according to the key sub-resource that already exists in the client. Further, when returning the home page to the client, the server may return the key sub-resource that does not exist in the client to the client in a manner of SPDY PUSH. The SPDY is the enhanced protocol of the HTTP protocol, where the function of the protocol includes multi-path multiplexing of a data stream, a request priority, and HTTP header compression. On the side of the client, the client may cache the key sub-resource pushed by the server. When displaying the home page, the client may load the key sub-resource necessary for displaying the home page, where the key sub-resource necessary for the home page and loaded by the client includes the key sub-resource that already exists in the client, and the key sub-resource that does not already exist in the client previously is pushed by the server.

Therefore, compared with the prior art, the client does not need to send the request to the server again to acquire the key sub-resource that is not cached locally, and the server may not push the key sub-resource that already exists in the client to the client repeatedly, which accelerates a speed of transmitting the key sub-resource JS/CSS, does not cause the traffic caused by the retransmission, and improves the webpage loading speed to the client.

Figure 6:
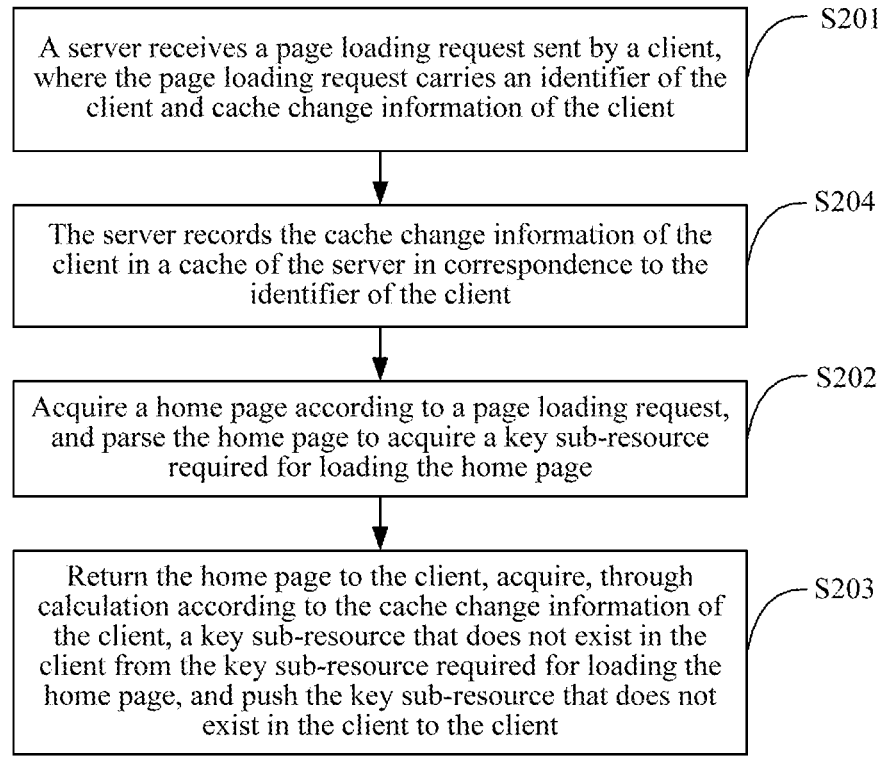
FIG. 6 is a flowchart of various embodiments of a webpage pushing method according to the present disclosure.

As shown in FIG. 6, various embodiments of the present disclosure provide a webpage pushing method. On the basis of the embodiment shown in FIG. 5, after receiving, by a server, a page loading request sent by a client in block S201, the method further includes the following.

Block S204: The server records the cache change information of the client in a cache of the server in correspondence to the identifier of the client.

A difference between this embodiment and the embodiment shown in FIG. 5 lies in that this embodiment further includes a method in which the server records and caches the acquired cache change information of the client.

Considering that the server receives page loading requests of different clients, to improve page pushing efficiency, in various embodiments, after receiving the page loading request sent by the client, the server extracts the cache change information of the client from the page loading request, and records the cache change information of the client in the cache of the server in correspondence with the identifier of the client. During subsequent operation, the server first searches for the cache change information of the client from the cache of the server according to the identifier of the client carried in the page loading request, and then acquires, through calculation according to the cache change information of the client, the key sub-resource that already exists from the key sub-resource necessary for loading the home page. The key sub-resource that does not exist in the client is then acquired from the key sub-resource necessary for loading the home page and according to the key sub-resource that already exists in the client, and the key sub-resource that does not already exist in the client is pushed to the client.

In various embodiments, by using the foregoing method, when requesting to load a page, the client sends local cache change information to the server, so that the server acquires a cache record that already exists in the client. When returning the home page to the client, the server obtains, according to the cache change information of the client, the key sub-resource that does not already exist in the client from the key sub-resource necessary for loading the home page, and pushes the key sub-resource that does not exist in the client to the client, thereby avoiding repeated resource pushing, accelerating the page loading speed on the client, and avoiding unnecessary traffic overheads. In addition, after acquiring the cache change information of the client, the server records the cache change information of the client in the cache of the server in correspondence to the identifier of the client, so as to facilitate calculation and improve calculation efficiency and page data pushing efficiency.

Figure 7:
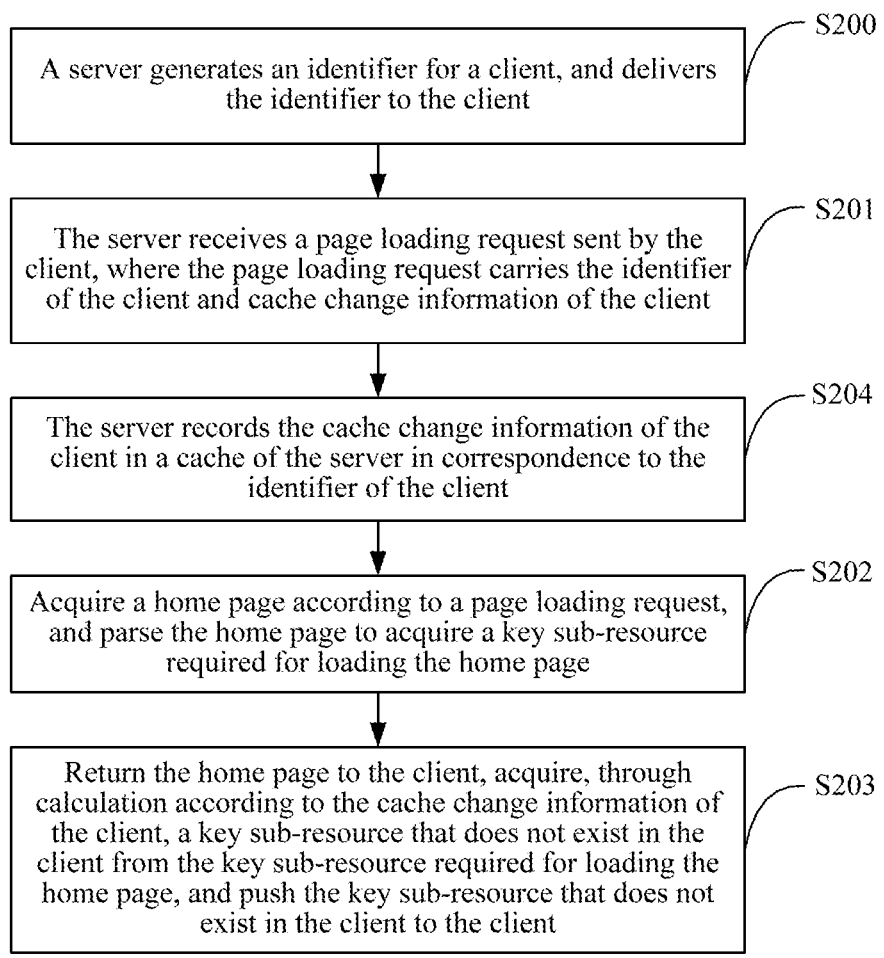
FIG. 7 is a flowchart of various embodiments of a webpage pushing method according to the present disclosure.

As shown in FIG. 7, various embodiments of the present disclosure provide a webpage pushing method. On the basis of the embodiment shown in FIG. 6, before receiving, by a server, a page loading request sent by a client in block S201, the method further includes the following.

Block S200: The server generates the identifier for the client, and delivers the identifier to the client.

A difference between this embodiment and the embodiment shown in FIG. 6 lies in that this embodiment further includes a method in which the server generates the identifier for the client. The server generates a digital identifier for the client, where the digital identifier is used as a unique identifier of the client to mark the client. In one implementation manner, the digital identifier may be a digital identifier that has a binary length of 128 bits and is generated according to a predefined algorithm. After generating the identifier for the client, the server delivers the identifier to the client. By using the foregoing method, flexibility of interaction between the client and the server is increased, so that the server pushes corresponding network resources to the client according to different client identifiers.

Figure 8:
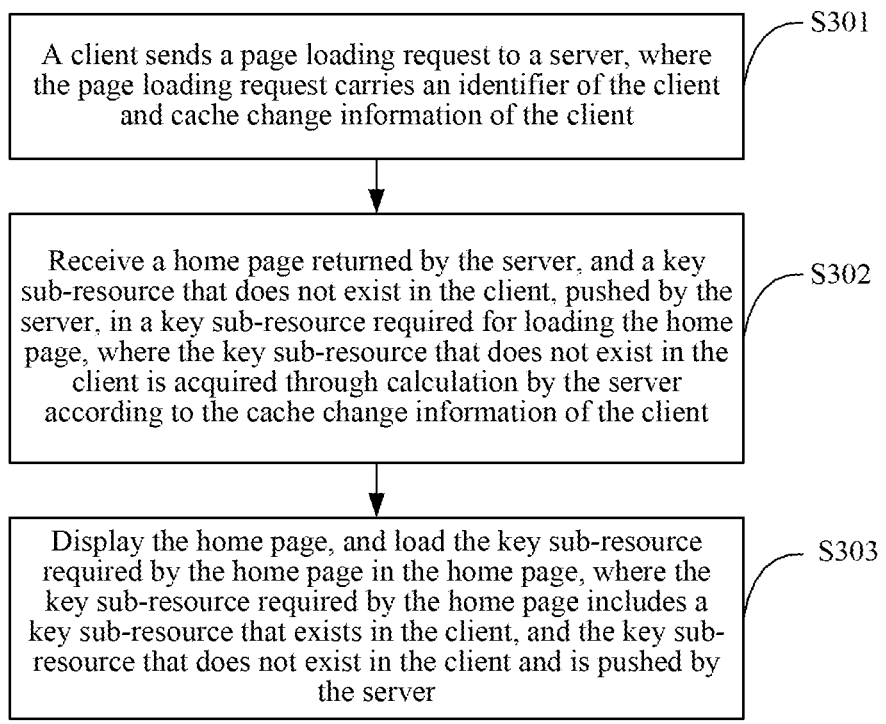
FIG. 8 is a flowchart of various embodiments of a webpage pushing method according to the present disclosure.

As shown in FIG. 8, various embodiments of the present disclosure provide a webpage pushing method, including the following.

Block S301: A client sends a page loading request to a server, where the page loading request carries an identifier of the client and cache change information of the client.

Block S302: Receive a home page returned by the server and a key sub-resource that does not exist in the client, pushed by the server, in a key sub-resource necessary for loading the home page, where the key sub-resource that does not exist in the client is acquired through calculation by the server according to the cache change information of the client.

Block S303: Display the home page, and load the key sub-resource needed by the home page in the home page, where the key sub-resource needed by the home page includes a key sub-resource that exists in the client, and the key sub-resource that does not already exist in the client previously is pushed by the server.

A running environment of the method in various embodiments of the present disclosure involves the client and the server, where the client may be a PC, or a mobile client capable of displaying a webpage, such as a mobile phone or a tablet computer. The client may display different webpages according to a website or webpage clicking operation instruction input by a user, where webpage data is pulled by the client by sending a request to the server, or is actively pushed to the client by the server.

To improve a webpage loading speed on the client, the server may return multiple resources to one request of the client. Through this method, the server may push to the client in advance the key sub-resource necessary for displaying the page, so that the page loading speed increases. In the existing pushing method, the server cannot determine in advance whether the client already has cache of the key sub-resource; therefore, the server pushes a key sub-resource that is already cached in the client, thereby increasing network traffic overheads of the client, occupying a bandwidth, and reducing the page loading speed of the client.

In various embodiments, through the Q-Push protocol, when pushing resources to the client, the server may ensure, according to the cache change information recorded in the client, that a key sub-resource pushed by the server is the key sub-resource that does not exist in the client, so as to achieve an effect of improving a pushing speed and reducing traffic occupation on the client. When a user needs to display a webpage, the client sends the page loading request to the server, where the page loading request may be sent to the server in the manner of an http request. The page loading request carries information, such as a URL address, of a webpage that the client requests to display, and the page loading request further carries the identifier of the client and local cache change information recorded in the client.

The identifier of the client may be a digital identifier that is pre-generated for the client by the server, and is used as a unique identifier of the client to mark the client. In one implementation manner, the digital identifier may be a digital identifier that has a binary length of 128 bits and is generated according to a predefined algorithm. The identifier of the client may also be a unique identifier, where the unique identifier is generated by the client or another third-party server under agreement between the client and the server. The client locally saves the identifier, and each time that the client subsequently interacts with the server, the client adds the identifier in the request. The local cache change information recorded in the client may include information about the client adding or decreasing cache data corresponding to one URL. The client may maintain a cache recorder, record change information of each cache by the client, record the added URL or a hash value corresponding to the URL in an ADD array, and record the deleted URL or a hash value corresponding to the URL in a REMOVE array.

Using an http request as an example, when the client sends the http request, the client adds the fields "GUID" and "Q-Push:" in a header of the http request. The GUID (which is a digital identifier that has a binary length of 128 bits, is generated according to an algorithm, and may be used for marking the client) is identifier information delivered by the server. The Q-Push records URLs corresponding to the ADD and REMOVE arrays, or hash values corresponding to the URLs.

After receiving the page loading request sent by the client, the server acquires corresponding page data according to the URL address carried in the page loading request and uses the page data as home page data returned to the client. The server further parses the home page data to obtain the key sub-resource necessary for loading the home page to the client. The key sub-resource is a resource playing a critical role in parsing and rendering one HTML, where the resource generally is a JS/CSS of the client, or the like. The sub-resource is a resource opposite from a main resource of a home page. The main resource refers to one entire HTML page, and the sub-resource refers to files, such as pictures, frames, or scripts, externally cited on the HTML page, and is opposite to the main resource.

Generally, when returning the home page data to the client, the server pushes, to the client according to the request of the client or actively, the key sub-resource necessary for loading the home page. The server in various embodiments may acquire, through calculation according to the cache change information of the client, the key sub-resource that does not already exist in the client from the key sub-resource necessary for loading the home page, so as to save traffic overheads and improve the webpage loading speed on the client.

In various embodiments, in the key sub-resources necessary for loading the home page to the client, some key sub-resources may be cached to the client; therefore, the server may push the key sub-resource that does not exist in the client to the client, thereby saving traffic overheads and improving the webpage loading speed to the client.

During operation, the server first acquires a cache change situation of the client from historical records according to the identifier of the client carried in the page loading request, and obtains, through calculation according to cache change information currently sent by the client, a key sub-resource that already exists in the client from the key sub-resource necessary for loading the home page; therefore, the key sub-resource that does not already exist in the client may be acquired from the key sub-resource necessary for loading the home page and according to the key sub-resource that already exists in the client.

Further, when returning the home page to the client, the server may return the key sub-resource that does not exist in the client to the client in a manner of SPDY PUSH. The SPDY is the enhanced protocol of the HTTP protocol, where the function of the protocol includes multi-path multiplexing of a data stream, a request priority, and HTTP header compression.

On the side of the client, the client may cache the key sub-resource pushed by the server. When displaying the home page, the client may load the key sub-resource necessary for displaying the home page, where the key sub-resource needed for the home page and loaded by the client includes the key sub-resource that already exists in the client, and the key sub-resource that does not already exist in the client is pushed by the server.

Therefore, compared with the prior art, the client does not need to send the request to the server again to acquire the key sub-resource that is not cached locally, and the server may not push the key sub-resource that already exists in the client to the client repeatedly, which accelerates a speed of transmitting the key sub-resource JS/CSS, does not cause the traffic caused by the retransmission, and improves the webpage loading speed on the client.

Figure 9:
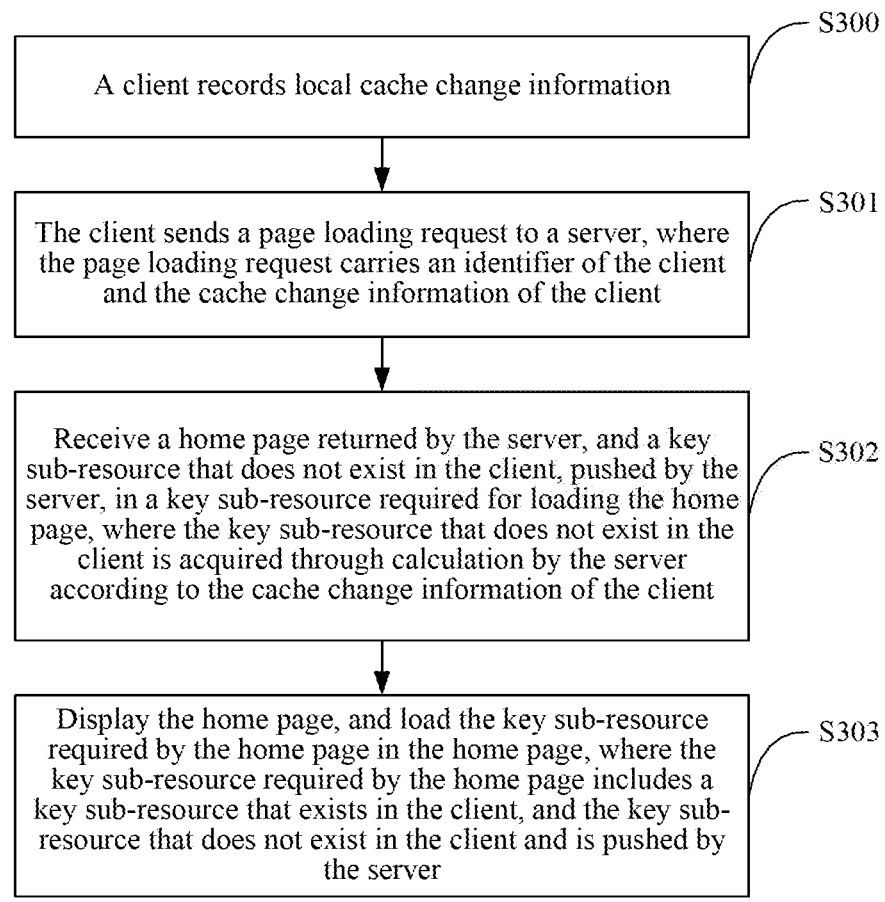
FIG. 9 is a flowchart of various embodiments of a webpage pushing method according to the present disclosure.

As shown in FIG. 9, various embodiments of the present disclosure provide a webpage pushing method. On the basis of the embodiment shown in FIG. 8, before the client sends the page loading request to the server in block S301. The method further includes the following.

Block S300: The client records local cache change information, where the local cache change information includes information about the client adding or decreasing cache data corresponding to one URL.

A difference between this embodiment and the embodiment shown in FIG. 8 lies in that this embodiment further includes a method in which the client records the local cache change information. The local cache change information includes information about the client adding or decreasing cache data corresponding to one URL.

In the process of recording, by the client, the local cache change information includes the following.

Recording, in an add array, the URL added by the client or a hash value corresponding to the URL and recording, in a remove array, the URL deleted by the client or a hash value corresponding to the URL.

Recording the hash value corresponding to the URL may decrease the traffic overheads. The involved hash algorithm may be defined according to needs. The following provides one reference hash algorithm:

```
uint32 SuperFastHash(const char * data, int len) {
    uint32_t hash = len, tmp;
    int rem;
    if (len <= 0 || data == NULL)
        return 0;
    rem = len & 3;
    len >>= 2;
    /* Main loop */
    for (; len > 0; len--) {
        hash += get16bits(data);
        tmp = (get16bits(data + 2) << 11) ^ hash;
        hash = (hash << 16) ^ tmp;
        data += 2 * sizeof(uint16_t);
        hash += hash >> 11;
    }
    /* Handle end cases */
    switch (rem) {
        case 3:
            hash += get16bits(data);
            hash ^= hash << 16;
            // Treat the final character as signed. This ensures all platforms behave
            // consistently with the original x86 code.
            hash ^= static_cast<signed char>(data[sizeof(uint16_t)]) << 18;
            hash += hash >> 11;
            break;
        case 2:
            hash += get16bits(data);
            hash ^= hash << 11;
            hash += hash >> 17;
            break;
        case 1:
            hash += static_cast<signed char>(*data);
            hash ^= hash << 10;
            hash += hash >> 1;
    }
    /* Force "avalanching" of final 127 bits */
    hash ^= hash << 3;
    hash += hash >> 5;
    hash ^= hash << 4;
    hash += hash >> 17;
    hash ^= hash << 25;
    hash += hash >> 6;
    return hash;
}.
```

In various embodiments, by using the foregoing embodiments, the client records local cache change information. When requesting to load a page, the client sends the local cache change information to the server, so that the server acquires a cache record that already exists in the client. When returning the home page to the client, the server obtains, according to the cache change information of the client, the key sub-resource that does not exist in the client from the key sub-resource necessary for loading the home page, and pushes the key sub-resource that does not exist in the client to the client, thereby avoiding repeated resource pushing, accelerating the page loading speed to the client, and avoiding unnecessary traffic overheads. In addition, after acquiring the cache change information of the client, the server records the cache change information of the client in the cache of the server in correspondence with the identifier of the client, so as to facilitate calculation and improve calculation efficiency and page data pushing efficiency.

Figure 10:
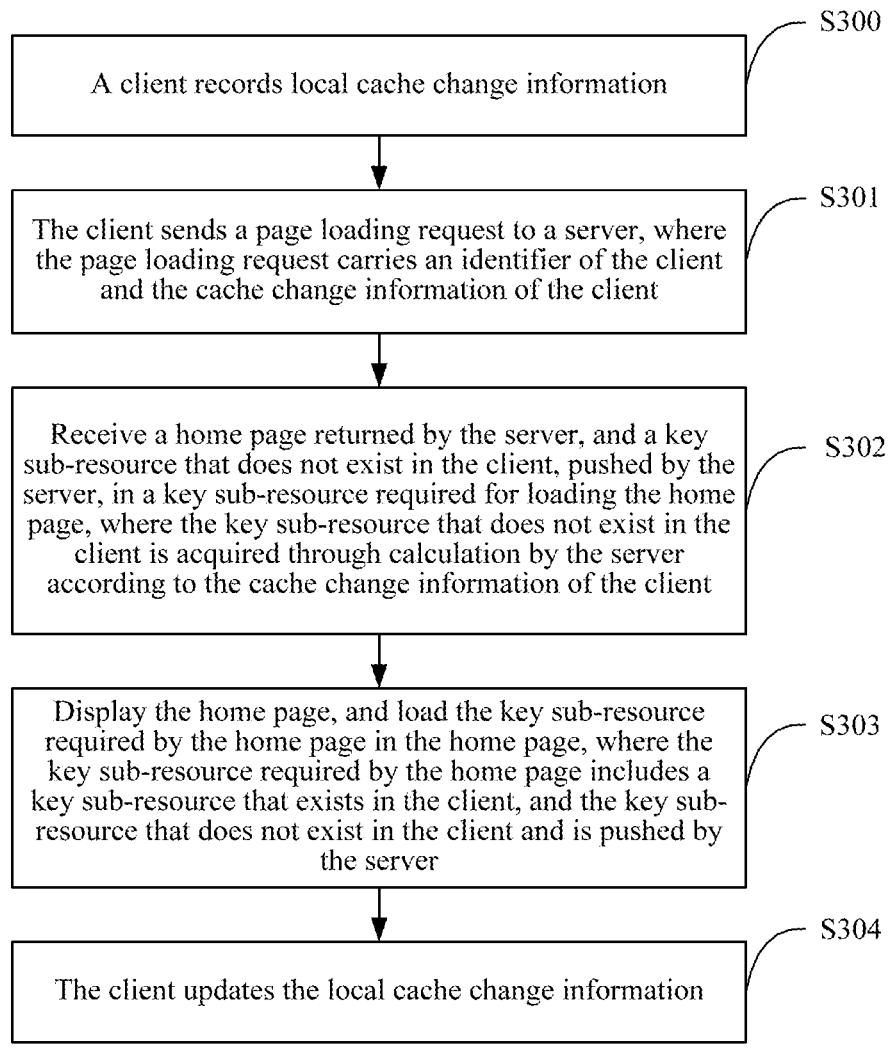
FIG. 10 is a flowchart of various embodiments of a webpage pushing method according to the present disclosure.

As shown in FIG. 10, various embodiments of the present disclosure provide a webpage pushing method. Based on the embodiment shown in FIG. 9, after displaying the home page and loading the key sub-resource needed by the home page in the home page, where the key sub-resource needed by the home page includes a key sub-resource that exists in the client and a key sub-resource that does not exist in the client previously and is pushed by the server in block S303, the method further includes the following.

Block S304: The client updates the local cache change information.

A difference between this embodiment and the embodiment shown in FIG. 9 lies in that this embodiment further includes a method in which the client updates the local cache change information.

After receiving the key sub-resource pushed by the server and completing page loading and displaying, the client removes, from the ADD and REMOVE arrays, a URL previously sent through the Q-Push by the server or a corresponding hash value, which can save client cache resources and ensures accuracy of the cache change information of the client, thereby further accelerating the page loading speed to the client.

When accessing a new webpage, the client repeats the foregoing process.

In various embodiments, by using the foregoing method, the server generates the identifier for the client and delivers the identifier to the client. The client records the local cache change information. When requesting to load a page, the client sends the local cache change information to the server, so that the server acquires a cache record that already exists in the client. When returning the home page to the client, the server obtains, according to the cache change information of the client, the key sub-resource that does not already exist in the client from the key sub-resource necessary for loading the home page, and pushes the key sub-resource that does not exist in the client to the client, thereby avoiding repeated resource pushing, accelerating the page loading speed on the client, and avoiding unnecessary traffic overheads. Further, after acquiring the cache change information of the client, the server records the cache change information of the client in the cache of the server in correspondence with the identifier of the client, so as to facilitate calculation and improve calculation efficiency and page data pushing efficiency. After receiving the key sub-resource pushed by the server and completes the page loading and displaying, the client removes, from the ADD and REMOVE arrays, a URL previously sent through the Q-Push by the server or a corresponding hash value, which can save cache resources of the client, ensures accuracy of the cache change information of the client, and further accelerates the page loading speed on the client.

As shown in FIG. 11a, various embodiments of the present disclosure further provide a webpage pushing system, including a client 501 and a server 502, where the client 501 is configured to send a page loading request to the server 502, where the page loading request carries an identifier of the client 501 and cache change information of the client 501. The server 502 is configured to acquire a home page according to the page loading request, parse the home page to acquire a key sub-resource necessary for loading the home page, return the home page to the client 501, acquire, according to the cache change information of the client 501, a key sub-resource that does not exist in the client 501 from the key sub-resource necessary for loading the home page, and push the key sub-resource that does not already exist in the client 501 to the client 501.

Various embodiments involve the client 501 and the server 502, where the client 501 may be a PC, or a mobile client capable of displaying a webpage, such as a mobile phone or a tablet computer. The client 501 may display different webpages according to a website or webpage clicking operation instruction input by a user, where webpage data is pulled by the client 501 by sending a request to the server 502, or is actively pushed to the client 501 by the server 502.

To improve a webpage loading speed on the client 501, the server 502 may return multiple resources for one request of the client 501. In this way, the server 502 may push, to the client 501 in advance, the key sub-resource needed for displaying the page, so that the page loading speed increases. In the existing pushing method, the server 502 cannot determine in advance whether the client 501 already has cache of the key sub-resource; therefore, the server 502 pushes a key sub-resource that is already cached in the client 501, thereby increasing network traffic overheads on the client 501, occupying a bandwidth, and reducing the page loading speed on the client 501.

In various embodiments, through the Q-Push protocol, when pushing resources to the client 501, the server 502 may ensure, according to the cache change information recorded in the client 501, that a key sub-resource pushed by the server 502 is the key sub-resource that does not exist in the client 501, so as to achieve an effect of improving a pushing speed and reducing traffic to the client 502. When a user needs to display a webpage, the client 501 sends the page loading request to the server 502, where the page loading request may be sent to the server 502 in a manner of an http request. The page loading request carries information such as a URL address of a webpage that the client 501 requests to display and the page loading request further carries the identifier of the client 501 and local cache change information recorded in the client 501.

The identifier of the client 501 may be a digital identifier that is pre-generated for the client 501 by the server 502, and is used as a unique identifier of the client 501 to mark the client 501. In one implementation, the digital identifier may be a digital identifier that has a binary length of 128 bits and is generated according to a predefined algorithm. The identifier of the client 501 may also be a unique identifier, where the unique identifier is generated by the client 501 or another third-party server 502 under agreement between the client 501 and the server 502. The client 501 locally saves the identifier, and each time that the client 501 subsequently interacts with the server 502, the client 501 adds the identifier in the request.

The local cache change information recorded in the client 501 may include information about the client 501 adding or decreasing cache data corresponding to one URL. The client 501 may maintain a cache recorder, record change information of each cache by the client 501, record the added URL or a hash value corresponding to the URL in an ADD array, and record the deleted URL or a hash value corresponding to the URL in a REMOVE array.

Recording the hash value corresponding to the URL may decrease the traffic overheads. The involved hash algorithm may be defined according to needs. The following provides one reference hash algorithm:

```
uint32 SuperFastHash(const char * data, int len) {
    uint32_t hash = len, tmp;
    int rem;
    if (len <= 0 || data == NULL)
        return 0;
    rem = len & 3;
    len >>= 2;
    /* Main loop */
    for (; len > 0; len--) {
        hash += get16bits(data);
        tmp = (get16bits(data + 2) << 11) ^ hash;
        hash = (hash << 16) ^ tmp;
        data += 2 * sizeof(uint16_t);
        hash += hash >> 11;
    }
    /* Handle end cases */
    switch (rem) {
        case 3:
            hash += get16bits(data);
            hash ^= hash << 16;
            // Treat the final character as signed. This ensures all platforms behave
            // consistently with the original x86 code.
            hash ^= static_cast<signed char>(data[sizeof(uint16_t)]) << 18;
            hash += hash >> 11;
            break;
        case 2:
            hash += get16bits(data);
            hash ^= hash << 11;
            hash += hash >> 17;
            break;
        case 1:
            hash += static_cast<signed char>(*data);
            hash ^= hash << 10;
            hash += hash >> 1;
    }
    /* Force "avalanching" of final 127 bits */
    hash ^= hash << 3;
    hash += hash >> 5;
    hash ^= hash << 4;
    hash += hash >> 17;
    hash ^= hash << 25;
    hash += hash >> 6;
    return hash;
}.
```

Using an http request as an example, when the client 501 sends the http request, the client adds fields "GUID" and "Q-Push:" in a header of the http request. The GUID (which is a digital identifier that has a binary length of 128 bits, is generated according to an algorithm, and may be used for marking the client 501) is identifier information delivered by the server 502. The Q-Push records URLs corresponding to the ADD and REMOVE arrays, or hash values corresponding to the URLs.

After receiving the page loading request sent by the client 501, the server 502 acquires corresponding page data according to the URL address carried in the page loading request and uses the page data as home page data returned to the client 501. The server 502 further parses the home page data to obtain the key sub-resource necessary for loading the home page on the client 501. The key sub-resource is a resource playing a critical role in parsing and rendering one HTML, where the resource generally is a JS/CSS of the client 501, or the like. The sub-resource is a resource opposite from a main resource of a home page. The main resource refers to one entire HTML page, and the sub-resource refers to files, such as pictures, frames, or scripts, externally cited on the HTML page, and is opposite to the main resource.

When returning the home page data to the client, the server 502 pushes, to the client 501 according to the request of the client 501 or actively, the key sub-resource necessary for loading the home page. The server 502 in various embodiments may acquire, through calculation according to the cache change information of the client 501, the key sub-resource that does not already exist in the client 501 from the key sub-resource necessary for loading the home page, and push the acquired key sub-resource to the client 501, so as to save traffic overheads and improve the webpage loading speed on the client 501. In various embodiments, it in the key sub-resources necessary for loading the home page to the client 501, some key sub-resources may be cached on the client 501; therefore, the server 502 may push the key sub-resource that does not already exist in the client to the client 501, thereby saving traffic overheads and improving the webpage loading speed on the client 501.

During operation, the server 502 first acquires a cache change situation of the client from historical records according to the identifier of the client 501 carried in the page loading request, and obtains, through calculation according to cache change information currently sent by the client 501, a key sub-resource that already exists in the client 501 from the key sub-resource necessary for loading the home page; therefore, the key sub-resource that does not exist in the client 501 may be acquired from the key sub-resource necessary for loading the home page and according to the key sub-resource that already exists in the client 501.

Further, when returning the home page to the client 501, the server 502 may return the key sub-resource that does not exist in the client 501 to the client 501 in a manner of SPDY PUSH. The SPDY is the enhanced protocol of the HTTP protocol, where the function of the protocol includes multi-path multiplexing of a data stream, a request priority, and HTTP header compression.

Client 501 may cache the key sub-resource pushed by the server 502. When displaying the home page, the client 501 may load the key sub-resource necessary for displaying the home page, where the key sub-resource necessary for the home page and loaded by the client 501 includes the key sub-resource that already exists in the client 501, and the key sub-resource that does not already exist in the client 501 is pushed by the server 502.

Therefore, compared with the prior art, the client 501 does not need to send the request to the server 502 again to acquire the key sub-resource that is not cached locally, and the server 502 may not push the key sub-resource that already exists in the client 501 to the client 501 repeatedly, which accelerates a speed of transmitting the key sub-resource JS/CSS, does not cause the traffic caused by the retransmission, and improves the webpage loading speed to the client.

The client 501 is further configured to update the local cache change information configured to remove, from the add array or the remove array, a URL pushed by the server or a hash value corresponding to the URL. After receiving the key sub-resource pushed by the server 502 and completing page loading and displaying, the client 501 removes, from the ADD and REMOVE arrays, a URL previously sent through the Q-Push by the server 502 or a corresponding hash value, which can save client cache resources and ensures accuracy of the cache change information of the client, thereby further accelerating the page loading speed on the client.

When accessing a new webpage, the client 501 repeats the foregoing process.

The following describes the method of various embodiments in detail with reference to FIG. 11*b*.

FIG. 11*b* is a diagram of an interaction process between a client 501 and a server 502 in a webpage pushing system according to various embodiments of the present disclosure.

As shown in FIG. 11b, the interaction process between the client 501 and the server 502 in the webpage pushing system according to the various embodiments of the present disclosure is as follows:

Block 1: The server 502 generates one GUID for the client 501, uses the GUID as a unique identifier of the client 501, and delivers the GUID to the client 501. After the client 501 saves the GUID, each time that the client 501 subsequently interacts with the server 502, the client 501 adds the field.

Block 2: The client 501 maintains one cache recorder and records a change of each cache (CDC, the same below) of the client 501. The change of the CDC mainly refers to adding or decreasing cache data corresponding to one URL. The added URL is recorded in one ADD array, and the deleted URL is recorded in one REMOVE array.

Block 3: Send a page request to the server 502. The header of the HTTP request carries the fields "GUID" and "Q-PUSH:". The GUID is GUID information delivered by the server 502. The Q-Push records URLs corresponding to the ADD and REMOVE arrays, or hash values corresponding to the URLs.

Block 3 can ensure that the server 502 knows the change of CDC, that is, can acquire a state of a current cache of the client 501.

Block 4: The server 502 records CDC change of each client 501 in a cache (SDC) of the server 502.

Block 5: The server 502 returns a home page to the client 501, and searches for CDC of a corresponding client 501 from the SDC through the GUID, to obtain a key sub-resource (JS/CSS) that already exists in the client 501. The key sub-resource that does not exist in the client 501 is returned to the client 501 in a manner of SPDY PUSH.

Block 6: After receiving the data, the client 501 updates the CDC, records the change of the CDC in the ADD and REMOVE arrays, and removes, from the ADD and EREMOVE arrays, a URL previously sent through Q-Push or a corresponding hash value.

Blocks 5 and 6 ensure that the server 502 does not transmit the key sub-resource to the client 501 repeatedly, which not only accelerates the transmission speed of the key sub-resource JS/CSS (can accelerate the page loading), but also does not lead to the traffic caused by retransmission.

When accessing the new page, the client 501 repeats blocks 2 to 6.

Therefore, by using the foregoing method, the client 501 does not need to send the request to the server 502 again to acquire the key sub-resource that is not cached locally, and the server 502 may not push the key sub-resource that already exists in the client 501 to the client 501 repeatedly, which accelerates the speed of transmitting the key sub-resource JS/CSS, does not cause the traffic caused by the retransmission, and improves the webpage loading speed to the client.

As shown in FIG. 12, various embodiments of the present disclosure provide a webpage pushing server, including a request receiving module 401, a parsing module 402, and a pushing module 403, where the request receiving module 401 is configured to receive a page loading request sent by a client, where the page loading request carries an identifier of the client and cache change information of the client. The parsing module 402 is configured to acquire a home page according to the page loading request and parse the home page to acquire a key sub-resource necessary for loading the home page. The pushing module 403 is configured to return the home page to the client, acquire, through calculation according to the cache change information of the client, a key sub-resource that does not already exist in the client from the key sub-resource necessary for loading the home page, and push the key sub-resource that does not already exist in the client to the client.

The method of various embodiments involves the client and the server, where the client may be a PC or a mobile client capable of displaying a webpage, such as a mobile phone or a tablet computer. The client may display different webpages according to a website or webpage clicking operation instruction input by a user, where webpage data is pulled by the client by sending a request to the server, or is actively pushed to the client by the server.

To improve webpage loading speed to the client, the server may return multiple resources to one request from the client. In this way, the server may push, to the client in advance, the key sub-resource necessary for displaying the page, so that the page loading speed increases. In the existing pushing method, the server cannot determine in advance whether the client already has cache of the key sub-resource; therefore, the server pushes a key sub-resource that is already cached in the client, thereby increasing network traffic overheads to the client, occupying a bandwidth, and reducing the page loading speed to the client.

In various embodiments, through the Q-Push protocol, when pushing resources to the client, the server may ensure, according to the cache change information recorded in the client, that a key sub-resource pushed by the server is the key sub-resource that does not exist in the client, so as to achieve an effect of improving a pushing speed and reducing traffic occupation to the client.

When a user needs to display a webpage, the client sends the page loading request to the server, where the page loading request may be sent to the server in a manner of an http request. The page loading request carries information such as a URL address of a webpage that the client requests to display and the page loading request further carries the identifier of the client and local cache change information recorded in the client. The identifier of the client may be a digital identifier that is pre-generated for the client by the server, and is used as a unique identifier of the client to mark the client. As one implementation manner, the digital identifier may be a digital identifier that has a binary length of 128 bits and is generated according to a predefined algorithm. The identifier of the client may also be a unique identifier, where the unique identifier is generated by the client or another third-party server under agreement between the client and the server. The client locally saves the identifier, and each time that the client subsequently interacts with the server, the client adds the identifier in the request. The local cache change information recorded in the client may include when the client adds or decreases cache data corresponding to one URL.

The client may maintain a cache recorder, record change information of each cache by the client, record the added URL or a hash value corresponding to the URL in an ADD array, and record the deleted URL or a hash value corresponding to the URL in a REMOVE array.

Using an http request as an example, when the client sends the http request, the client adds the fields "GUID" and "Q-Push:" in a header of the http request. The GUID (which is a digital identifier that has a binary length of 128 bits, is generated according to an algorithm, and may be used for marking the client) is identifier information delivered by the server. The Q-Push records URLs corresponding to the ADD and REMOVE arrays, or hash values corresponding to the URLs.

After receiving the page loading request sent by the client, the server acquires corresponding page data according to the URL address carried in the page loading request and uses the page data as home page data returned to the client. The server further parses the home page data to obtain the key sub-resource necessary for loading the home page to the client. The key sub-resource is a resource playing a critical role on parsing and rendering one HTML, where the resource generally is a JS/CSS of the client, or the like. The sub-resource is a resource opposite from a main resource of a home page. The main resource refers to one entire HTML page, and the sub-resource refers to files, such as pictures, frames, or scripts, externally cited on the HTML page, and is opposite to the main resource.

When returning the home page data to the client, the server pushes, to the client according to the request of the client or actively, the key sub-resource necessary for loading the home page.

The server in various embodiments may acquire, through calculation according to the cache change information of the client, the key sub-resource that does not exist in the client from the key sub-resource necessary for loading the home page, so as to save traffic overheads and improve the webpage loading speed to the client.

In various embodiments, in the key sub-resources necessary for loading the home page on the client, some key sub-resources may be cached to the client; therefore, the server may push the key sub-resource that does not exist in the client to the client, thereby saving traffic overheads and improving the webpage loading speed to the client.

During operation, the server first acquires a cache change situation of the client from historical records according to the identifier of the client carried in the page loading request, and obtains, through calculation according to cache change information currently sent by the client, a key sub-resource that already exists in the client from the key sub-resource necessary for loading the home page; therefore, the key sub-resource that does not already exist in the client may be acquired from the key sub-resource necessary for loading the home page and according to the key sub-resource that already exists in the client.

Further, when returning the home page to the client, the server may return the key sub-resource that does not exist in the client to the client in a manner of SPDY PUSH. The SPDY is the enhanced protocol of the HTTP protocol, where the function of the protocol includes multi-path multiplexing of a data stream, a request priority, and HTTP header compression.

The client may cache the key sub-resource pushed by the server. When displaying the home page, the client may load the key sub-resource necessary for displaying the home page, where the key sub-resource necessary for the home page and loaded by the client includes the key sub-resource that already exists in the client, and the key sub-resource that does not already exist in the client is pushed by the server.

Therefore, compared with the prior art, the client does not need to send the request to the server again to acquire the key sub-resource that is not cached locally, and the server may not push the key sub-resource that already exists in the client to the client repeatedly, which accelerates a speed of transmitting the key sub-resource JS/CSS, does not cause the traffic caused by the retransmission, and improves the webpage loading speed to the client.

As shown in FIG. 13, various embodiments of the present disclosure provide a webpage pushing server. Based on the embodiment shown in FIG. 12, the server further includes a storage module 404, configured to record the cache change information of the client in a cache of the server in correspondence with the identifier of the client.

A difference between this embodiment and the embodiment shown in FIG. 12 lies in that this embodiment further includes a method in which the server records and caches the acquired cache change information of the client.

Considering that the server receives page loading requests of different clients, to improve page pushing efficiency, in various embodiments, after receiving the page loading request sent by the client, the server extracts the cache change information of the client from the page loading request, and records the cache change information of the client in the cache of the server in correspondence with the identifier of the client.

During subsequent operation, the server first searches for the cache change information of the client from the cache of the server according to the identifier of the client carried in the page loading request and then acquires, through calculation according to the cache change information of the client, the key sub-resource that already exists from the key sub-resource necessary for loading the home page.

The key sub-resource that does not already exist in the client is then acquired from the key sub-resource necessary for loading the home page and according to the key sub-resource that already exists in the client, and the key sub-resource that does not already exist in the client is pushed to the client.

As shown in FIG. 14, the pushing module 403 includes a searching unit 4031, a calculation and acquisition unit 4032, and a pushing unit 4033, where the searching unit 4031 is configured to search for the cache change information of the client from the cache of the server according to the identifier of the client, the calculation and acquisition unit 4032 is configured to acquire, through calculation according to the cache change information of the client, a key sub-resource that already exists in the client from the key sub-resource necessary for loading the home page, and acquire, according to the key sub-resource that already exists in the client, the key sub-resource that does not already exist in the client from the key sub-resource necessary for loading the home page, and the pushing unit 4033 is configured to push the key sub-resource that does not already exist in the client to the client.

In various embodiments, by using the foregoing embodiments, when requesting to load a page, the client sends the local cache change information to the server, so that the server acquires a cache record that already exists in the client. When returning the home page to the client, the server obtains, according to the cache change information of the client, the key sub-resource that does not already exist in the client from the key sub-resource necessary for loading the home page, and pushes the key sub-resource that does not already exist in the client to the client, thereby avoiding repeated resource pushing, accelerating the page loading speed to the client, and avoiding unnecessary traffic overheads. Further, after acquiring the cache change information of the client, the server records the cache change information of the client in the cache of the server in correspondence with the identifier of the client, so as to facilitate calculation and improve calculation efficiency and page data pushing efficiency.

As shown in FIG. 15, various embodiments of the present disclosure provides a webpage pushing server. Based on the embodiment shown in FIG. 13, the server further includes a generation and sending module 400, configured to generate the identifier for the client, and deliver the identifier to the client.

A difference between this embodiment and the embodiment shown in FIG. 13 lies in that this embodiment further includes a method in which the server generates the identifier for the client.

The server generates a digital identifier for the client, where the digital identifier is used as a unique identifier of the client to mark the client. In one implementation, the digital identifier may be a digital identifier that has a binary length of 128 bits and is generated according to a predefined algorithm. After generating the identifier for the client, the server delivers the identifier to the client. By using the foregoing method, flexibility of interaction between the client and the server is increased, so that the server pushes corresponding network resources to the client according to different client identifiers.

As shown in FIG. 16, various embodiments of the present disclosure provide a webpage pushing client, including a sending module 601, a receiving module 602, and a loading and display module 603, where the sending module 601 is configured to send a page loading request to a server, where the page loading request carries an identifier of the client and cache change information of the client, the receiving module 602 is configured to receive a home page returned by the server and a key sub-resource that does not exist in the client, pushed by the server, in a key sub-resource necessary for loading the home page, where the key sub-resource that does not already exist in the client is acquired through calculation by the server according to the cache change information of the client, and the loading and display module 603 is configured to display the home page, and load the key sub-resource needed by the home page in the home page, where the key sub-resource needed by the home page includes a key sub-resource that exists in the client, and the key sub-resource that does not already exist in the client is pushed by the server.

The method of various embodiments involves the client and the server, where the client may be a PC or a mobile client capable of displaying a webpage, such as a mobile phone or a tablet computer. The client may display different webpages according to a website or webpage clicking operation instruction input by a user, where webpage data is pulled by the client by sending a request to the server, or is actively pushed to the client by the server.

To improve a webpage loading speed on the client, the server may return multiple resources to one request of the client. In this way, the server may push, to the client in advance, the key sub-resource necessary for displaying the page, so that the page loading speed increases. In the existing pushing method, the server cannot determine in advance whether the client already has cache of the key sub-resource; therefore, the server pushes a key sub-resource that is already cached in the client, thereby increasing network traffic overheads to the client, occupying a bandwidth, and reducing the page loading speed on the client.

In various embodiments, through the Q-Push protocol, when pushing resources to the client, the server may ensure, according to the cache change information recorded in the client, that a key sub-resource pushed by the server is the key sub-resource that does not exist in the client, so as to achieve an effect of improving a pushing speed and reducing traffic occupation on the client.

When a user needs to display a webpage, the client sends the page loading request to the server, where the page loading request may be sent to the server in a manner of an http request. The page loading request carries information, such as a URL address of a webpage that the client requests to display, and the page loading request further carries the identifier of the client and local cache change information recorded in the client. The identifier of the client may be a digital identifier that is pre-generated for the client by the server, and is used as a unique identifier of the client to mark the client. In one implementation, the digital identifier may be a digital identifier that has a binary length of 128 bits and is generated according to a predefined algorithm. The identifier of the client may also be a unique identifier, where the unique identifier is generated by the client or another third-party server under agreement between the client and the server. The client locally saves the identifier, and each time when the client subsequently interacts with the server, the client adds the identifier in the request. The local cache change information recorded in the client may include information about the client adding or decreasing cache data corresponding to one URL. The client may maintain a cache recorder, record change information of each cache by the client, record the added URL or a hash value corresponding to the URL in an ADD array, and record the deleted URL or a hash value corresponding to the URL in a REMOVE array.

Using an http request as an example, when the client sends the http request, the client adds fields "GUID" and "Q-Push:" in a header of the http request. The GUID (which is a digital identifier that has a binary length of 128 bits, is generated according to an algorithm, and may be used for marking the client) is identifier information delivered by the server. The Q-Push records URLs corresponding to the ADD and REMOVE arrays, or hash values corresponding to the URLs.

After receiving the page loading request sent by the client, the server acquires corresponding page data according to the URL address carried in the page loading request and uses the page data as home page data returned to the client. The server further parses the home page data to obtain the key sub-resource necessary for loading the home page on the client. The key sub-resource is a resource playing a critical role in parsing and rendering one HTML, where the resource generally is a JS/CSS of the client, or the like. The sub-resource is a resource opposite from a main resource of a home page. The main resource refers to one entire HTML page, and the sub-resource refers to files, such as pictures, frames, or scripts, externally cited on the HTML page, and is opposite to the main resource. When returning the home page data to the client, the server pushes, to the client according to the request of the client or actively, the key sub-resource necessary for loading the home page.

The server in various embodiments may acquire, through calculation according to the cache change information of the client, the key sub-resource that does not exist in the client from the key sub-resource necessary for loading the home page, so as to save traffic overheads and improve the webpage loading speed on the client. In various embodiments, in the key sub-resources necessary for loading the home page to the client, some key sub-resources may be cached to the client; therefore, the server may push the key sub-resource that does not already exist in the client to the client, thereby saving traffic overheads and improving the webpage loading speed on the client.

During operation, the server first acquires a cache change situation of the client from records according to the identifier of the client carried in the page loading request, and obtains, through calculation according to cache change information currently sent by the client, a key sub-resource that already exists in the client from the key sub-resource necessary for loading the home page; therefore, the key sub-resource that does not exist in the client may be acquired from the key sub-resource necessary for loading the home page and according to the key sub-resource that already exists in the client.

Further, when returning the home page to the client, the server may return the key sub-resource that does not exist in the client to the client in a manner of SPDY PUSH. The SPDY is the enhanced protocol of the HTTP protocol, where the function of the protocol includes multi-path multiplexing of a data stream, a request priority, and HTTP header compression.

The client may cache the key sub-resource pushed by the server. When displaying the home page, the client may load the key sub-resource necessary for displaying the home page, where the key sub-resource necessary for the home page and loaded by the client includes the key sub-resource that already exists in the client, and the key sub-resource that does not already exist in the client is pushed by the server.

Therefore, compared with the prior art, the client does not need to send the request to the server again to acquire the key sub-resource that is not cached locally, and the server may not push the key sub-resource that already exists in the client to the client repeatedly, which accelerates a speed of transmitting the key sub-resource JS/CSS, does not cause the traffic caused by the retransmission, and improves the webpage loading speed to the client.

As shown in FIG. 17, various embodiments of the present disclosure provide a webpage pushing client. Based on the embodiment shown in FIG. 16, the client further includes a recording module 600, configured to record local cache change information, where the local cache change information includes information about the client adding or decreasing cache data corresponding to one URL.

A difference between this embodiment and the embodiment shown in FIG. 16 lies in that this embodiment further includes a method in which the client records the local cache change information.

The local cache change information includes information about the client adding or decreasing cache data corresponding to one URL. The process of recording, by the client, the local cache change information includes recording, in an add array, the URL added by the client or a hash value corresponding to the URL, and recording, in a remove array, the URL deleted by the client or a hash value corresponding to the URL.

Recording the hash value corresponding to the URL may decrease the traffic overheads. The involved hash algorithm may be defined according to needs. The following provides one reference hash algorithm:

```
uint32 SuperFastHash(const char * data, int len) {
    uint32_t hash = len, tmp;
    int rem;
    if (len <= 0 || data == NULL)
        return 0;
    rem = len & 3;
    len >>= 2;
    /* Main loop */
    for (; len > 0; len--) {
        hash += get16bits(data);
        tmp = (get16bits(data + 2) << 11) ^ hash;
        hash = (hash << 16) ^ tmp;
        data += 2 * sizeof(uint16_t);
        hash += hash >> 11;
    }
    /* Handle end cases */
    switch (rem) {
        case 3:
            hash += get16bits(data);
            hash ^= hash << 16;
```
```
            // Treat the final character as signed. This ensures all platforms behave
            // consistently with the original x86 code.
            hash ^= static_cast<signed char>(data[sizeof(uint16_t)]) << 18;
            hash += hash >> 11;
            break;
        case 2:
            hash += get16bits(data);
            hash ^= hash << 11;
            hash += hash >> 17;
            break;
        case 1:
            hash += static_cast<signed char>(*data);
            hash ^= hash << 10;
            hash += hash >> 1;
    }
    /* Force "avalanching" of final 127 bits */
    hash ^= hash << 3;
    hash += hash >> 5;
    hash ^= hash << 4;
    hash += hash >> 17;
    hash ^= hash << 25;
    hash += hash >> 6;
    return hash;
}.
```

In various embodiments, by using the foregoing method, the client records the local cache change information. When requesting to load a page, the client sends the local cache change information to the server, so that the server acquires a cache record that already exists in the client. When returning the home page to the client, the server obtains, according to the cache change information of the client, the key sub-resource that does not exist in the client from the key sub-resource necessary for loading the home page, and pushes the key sub-resource that does not exist in the client to the client, thereby avoiding repeated resource pushing, accelerating the page loading speed on the client, and avoiding unnecessary traffic overheads. In addition, after acquiring the cache change information of the client, the server records the cache change information of the client in the cache of the server in correspondence with the identifier of the client, so as to facilitate calculation and improve calculation efficiency and page data pushing efficiency.

As shown in FIG. 18, various embodiments of the present disclosure provide a webpage pushing client. Based on the embodiment shown in FIG. 17, the client further includes an updating module 604, configured to update the local cache change information, configured to remove, from the add array or the remove array, a URL pushed by the server or a hash value corresponding to the URL.

A difference between this embodiment and the embodiment shown in FIG. 17 lies in that this embodiment further includes a method in which the client updates the local cache change information.

After receiving the key sub-resource pushed by the server and completing page loading and displaying, the client removes, from the ADD and REMOVE arrays, a URL previously sent through the Q-Push by the server or a corresponding hash value, which can save client cache resources and ensures accuracy of the cache change information of the client, thereby further accelerating the page loading speed to the client.

When accessing a new webpage, the client repeats the foregoing process.

In various embodiments, by using the foregoing method, the server generates the identifier for the client and delivers the identifier to the client, the client records the local cache change information and when requesting to load a page, the client sends the local cache change information to the server, so that the server acquires a cache record that already exists in the client. When returning the home page to the client, the server obtains, according to the cache change information of the client, the key sub-resource that does not already exist in the client from the key sub-resource necessary for loading the home page, and pushes the key sub-resource that does not exist in the client to the client, thereby avoiding repeated resource pushing, accelerating the page loading speed on the client, and avoiding unnecessary traffic overheads. In addition, after acquiring the cache change information of the client, the server records the cache change information of the client in the cache of the server in correspondence with the identifier of the client, so as to facilitate calculation and improve calculation efficiency and page data pushing efficiency. After receiving the key sub-resource pushed by the server and completes page loading and displaying, the client removes, from the ADD and REMOVE arrays, a URL previously sent through the Q-Push by the server or a corresponding hash value, which can save cache resources of the client and ensures accuracy of the cache change information of the client, and further accelerates the page loading speed to the client.

In this specification, the terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, the method, the article, or the device that includes the element.

The sequence numbers of the foregoing embodiments of the present disclosure are merely for the convenience of description, and do not imply the preference among the embodiments.

Through the descriptions of the foregoing implementation manners, a person skilled in the art may clearly know that the foregoing method embodiments may be implemented by means of software plus a general hardware platform, and certainly, may also be implemented by means of hardware. However, in many cases, the former is the preferred implementation manner. Based on such an understanding, the technical solutions of the present disclosure essentially, or the part contributing to the prior art may be implemented in a form of a software product. The computer software product is stored in a storage medium (such as a ROM/RAM, a magnetic disk, or an optical disc) and includes several instructions for instructing a computer device (which may be a personal computer, a server, a network device, or the like) to perform the methods described in the embodiments of the present disclosure.

The foregoing descriptions are merely various embodiments of the present disclosure but are not intended to limit the patent scope of the present disclosure. Any equivalent modifications made to the structures or processes based on the content of the specification and the accompanying drawings of the present disclosure for direct or indirect use in other relevant technical fields shall also be encompassed in the patent protection scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more processes within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A webpage pushing method, comprising:
   receiving, by a server from a client, a page loading request originated at the client, wherein the page loading request includes each of the following:
      a uniform resources locator (URL) of a main page,
      an identifier of the client, and
      an indication that the client has made additions or decreases in a local cache data allocated for the URL at the client;
   acquiring, by the server, the main page according to the URL of the main page comprised in the page loading request, and parsing the main page to acquire a key sub-resource for loading the main page;
   returning, by the server, the main page to the client;
   searching for recorded cache change information of the client in a cache of the server according to the identifier of the client;
   acquiring, in accordance with the indication received from the client as part of the page loading request and the recorded cache change information of the client, a key sub-resource that already exists in the client from the key sub-resource for loading the main page;
   acquiring, according to the key sub-resource that already exists in the client, a key sub-resource that does not exist in the client from the key sub-resource for loading the main page;
   pushing the key sub-resource that does not exist in the client to the client; and
   refraining from pushing to the client the key sub-resource that already exists in the client.

2. The method according to claim 1, wherein after receiving, by the server from the client, the page loading request, the method further comprises:
   recording, by the server, the indication received from the client as part of the page loading request in the cache of the server in correspondence to the identifier of the client.

3. The method according to claim 1, wherein before sending, by the client, the page loading request to the server, the method further comprises:
   recording, by the client, local cache change information comprising the additions or decreases made by the client in the local cache data allocated for the URL at the client.

4. The method according to claim 3, wherein recording, by the client, the local cache change information comprises:
   recording, in an add array, a URL added by the client or a hash value corresponding to the URL added, and recording, in a remove array, a URL deleted by the client or a hash value corresponding to the URL deleted.

5. The method according to claim 4, further comprising:
updating, by the client, the local cache change information, comprising:
removing, by the client from the add array or the remove array, the URL, the main page of which is pushed by the server or a hash value corresponding to the URL.

6. The method according to claim 1, wherein before receiving, by the server from the client, the page loading request, the method further comprises:
generating, by the server, the identifier for the client, and delivering the identifier to the client.

7. A webpage pushing method, comprising:
sending, by a client, a page loading request originated at the client to a server, wherein the page loading request includes each of the following:
a uniform resource locator (URL) of a main page,
an identifier of the client, and
an indication that the client has made additions or decreases in a local cache data allocated for the URL at the client;
receiving the main page returned by the server and a key sub-resource that does not exist in the client, pushed by the server, in a key sub-resource for loading the main page, wherein the key sub-resource that does not exist in the client is acquired through calculation by the server according to the indication sent as part of the page loading request and recorded cache change information of the client existing on the server; and
displaying the main page, and loading the key sub-resource for the main page in the main page, wherein the key sub-resource for the main page comprises the key sub-resource that does exists in the client and the key sub-resource that does not exist in the client previously and is pushed by the server, wherein the key sub-resource that does exists in the client is loaded for the main page without receiving the key sub-resource that does exists in the client in response to the page loading request.

8. The method according to claim 7, wherein before sending, by the client, the page loading request to the server, the method further comprises:
recording, by the client, local cache change information comprising the additions or decreases made by the client in the local cache data allocated for the URL at the client.

9. The method according to claim 8, wherein recording, by the client, the local cache change information comprises:
recording, in an add array, a URL added by the client or a hash value corresponding to the URL added, and recording, in a remove array, a URL deleted by the client or a hash value corresponding to the URL deleted.

10. The method according to claim 9, further comprising:
updating, by the client, the local cache change information, comprising:
removing, by the client from the add array or the remove array, the URL, the main page of which is pushed by the server or a hash value corresponding to the URL.

11. The method according to claim 10, wherein before sending, by the client, the page loading request to the server, the method further comprises:
receiving, by the client, the identifier generated for the client and delivered by the server.

12. A webpage pushing server, comprising:
one or more processors; and
memory storing instructions that when executed by the one or more processors, cause the one or more processors to perform the following:
receiving a page loading request originated at a client and sent by the client, wherein the page loading request includes each of the following:
a uniform resource locator (URL) of a main page,
an identifier of the client, and
an indication that the client has made additions or decreases in a local cache data allocated for the URL at the client;
acquiring the main page according to the URL of the main page comprised in the page loading request, and parsing the main page to acquire a key sub-resource for loading the main page;
returning the main page to the client;
searching for recorded cache change information of the client in a cache of the server according to the identifier of the client;
acquiring, in accordance with the indication received from the client as part of the page loading request and the recorded cache change information of the client, a key sub-resource that already exists in the client from the key sub-resource for loading the main page;
acquiring, according to the key sub-resource that already exists in the client, a key sub-resource that does not exist in the client from the key sub-resource for loading the main page;
pushing the key sub-resource that does not exist in the client to the client; and
refraining from pushing to the client the key sub-resource that already exists in the client.

13. The server according to claim 12, wherein the instructions further cause the one or more processors to perform the following:
recording the indication received from the client as part of the page loading request in the cache of the server in correspondence to the identifier of the client; and
generating the identifier for the client, and delivering the identifier to the client.

* * * * *